US012753364B2

(12) United States Patent
Fuenzalida Diaz et al.

(10) Patent No.: US 12,753,364 B2
(45) Date of Patent: Oct. 6, 2026

(54) RECOVERY METHOD FOR NEUTRAL AND LIPID COMPONENTS CONTAINED IN TALL OIL SOAP (TOS) OR ITS SAPONIFIED DERIVATIVES: LIPID COMPONENTS SUCH AS FATTY ACIDS (FA), ROSINIC ACIDS (RA), NEUTRAL COMPONENTS OR NEUTRAL MATERIAL (NM) INCLUDING PHYTOSTEROLS

(71) Applicants: AMERICAN BIOPROCESS SpA, Quilpue (CL); Miguel Angel Fuenzalida Diaz, Santiago (CL)

(72) Inventors: Miguel Angel Fuenzalida Diaz, Santiago (CL); Rodrigo Alejandro Mancilla Villalobos, Valparaiso (CL); Raul Ignacio Aravena Contreras, Santiago (CL)

(73) Assignees: AMERICAN BIOPROCESS SPA, Quilpue (CL); Miguel Angel Fuenzalida Diaz, Santiago (CL)

( * ) Notice: Subject to any disclaimer, the term of this patent is extended or adjusted under 35 U.S.C. 154(b) by 576 days.

(21) Appl. No.: 18/549,025

(22) PCT Filed: Mar. 3, 2022

(86) PCT No.: PCT/IB2022/051901

§ 371 (c)(1),
(2) Date: Sep. 5, 2023

(87) PCT Pub. No.: WO2022/185258

PCT Pub. Date: Sep. 9, 2022

(65) Prior Publication Data

US 2024/0110126 A1 Apr. 4, 2024

(30) Foreign Application Priority Data

Mar. 5, 2021 (CL) .................................. 0551-2021

(51) Int. Cl.
*C11B 13/02* (2006.01)

(52) U.S. Cl.
CPC .................................. *C11B 13/02* (2013.01)

(58) Field of Classification Search
None
See application file for complete search history.

(56) References Cited

U.S. PATENT DOCUMENTS

| | | | | |
|---|---|---|---|---|
| 1,912,440 | A | 6/1933 | Frey et al. | |
| 2,528,025 | A | 10/1950 | Whyte | |
| 2,534,809 | A | 12/1950 | Christenson et al. | |
| 2,536,753 | A | 1/1951 | Willem Knol | |
| 2,568,202 | A * | 9/1951 | Overhoff | C07J 75/00 552/545 |
| 2,715,638 | A * | 8/1955 | Albrecht | C07J 75/00 552/545 |
| 2,715,639 | A * | 8/1955 | Albrecht | C07J 9/00 552/545 |
| 3,887,537 | A * | 6/1975 | Harada | C11B 13/005 552/545 |
| 4,076,700 | A * | 2/1978 | Harada | C11B 13/005 530/206 |
| 6,107,456 | A | 8/2000 | Huibers et al. | |
| 6,297,353 | B1 | 10/2001 | Fuenzalida Diaz et al. | |
| 6,780,831 | B2 | 8/2004 | Hamunen | |
| 6,846,941 | B2 | 1/2005 | Rohr et al. | |
| 7,173,144 | B1 | 2/2007 | Hattori et al. | |
| 9,221,869 | B2 * | 12/2015 | Stigsson | C11C 3/003 |
| 9,422,507 | B2 * | 8/2016 | Hamunen | C11B 13/005 |
| 2005/0197490 | A1 * | 9/2005 | Rojas | C11B 13/005 530/205 |

FOREIGN PATENT DOCUMENTS

| | | | |
|---|---|---|---|
| WO | 99042471 | A1 | 8/1999 |
| WO | 2000015652 | A1 | 3/2000 |
| WO | 2000064921 | A2 | 11/2000 |
| WO | 200132681 | A1 | 5/2001 |
| WO | 2003064442 | A2 | 8/2003 |
| WO | 2008099051 | A2 | 8/2008 |
| WO | 2015010179 | A1 | 1/2015 |

OTHER PUBLICATIONS

International Search Report and Written Opinion for Corresponding International Application No. PCT/IB2022/051901, dated Jun. 28, 2022 (8 pages).

* cited by examiner

*Primary Examiner* — Peter A Salamon
(74) *Attorney, Agent, or Firm* — LUCAS & MERCANTI, LLP

(57) ABSTRACT

A method of separation and recovery of neutral and lipid components contained in saponifiable mixtures such as lipids and residues of plant and animal origin or saponified such as Tall Oil Soap (TOS), or in their saponified derivatives, which is based on differences in their solubility in a solvent or in a mixture of solvents from the group consisting of water and alcohols.

31 Claims, No Drawings

RECOVERY METHOD FOR NEUTRAL AND LIPID COMPONENTS CONTAINED IN TALL OIL SOAP (TOS) OR ITS SAPONIFIED DERIVATIVES: LIPID COMPONENTS SUCH AS FATTY ACIDS (FA), ROSINIC ACIDS (RA), NEUTRAL COMPONENTS OR NEUTRAL MATERIAL (NM) INCLUDING PHYTOSTEROLS

CROSS REFERENCE TO RELATED APPLICATION

This application is a 371 of PCT/IB2022/051901, filed Mar. 3, 2022, which claims the benefit of Chilean Patent Application No. 0551-2021 filed on Mar. 5, 2021, the contents of each application are incorporated herein by reference.

OBJECT OF THE INVENTION

The invention relates to a method of separation and recovery of neutral and lipid components contained in saponifiable mixtures such as lipids and residues of plant and animal origin or saponified such as Tall Oil Soap (TOS), or in their saponified derivatives, said method is based on differences in their solubility in a solvent or in a mixture of solvents from the group consisting of water and alcohols.

By the method of the present invention, it is possible to separate neutral material (NM), including fatty alcohols and sterols, from various saponified raw materials, including TOS, by dissolving them in a mixture of water and alcohols.

By the method of the present invention, a recovery of acidulation products is also possible after removing the NM from the saponified product, for example, the TOS or from any of its saponified derivatives. Thus, in the case of TOS, it is possible to recover refined Tall Oil (TO) consisting mainly of fatty acids and rosinic acids.

FIELD OF THE INVENTION

Saponifiable residues from refining or obtaining derivatives of oils of animal origin, saponifiable residues of vegetable oils such as palm, soybean or others, and also saponifiable wastes from biodiesel production and especially soap that is separated from the wood pulp liquor and other cellulose sources, better known as Tall Oil Soap (TOS) are among the raw materials of the present invention.

TOS is a mixture of fatty acid and rosinic acid sodium salts and includes neutral material (NM) consisting, among other components, of alcohols and fatty aldehydes with between 14 and 30 carbon atoms, sterols and lignins. It results from a decantation and skimming process of the black liquor, which in turn, is the residual broth of Kraft pulp leading to cellulose release from wood.

TOS is collected in cellulose plants and acidulated to convert it into Tall Oil (TO), a hydrophobic mixture of fatty acids, rosinic acids and NM that includes species such as phytosterols, with removal of an aqueous brine.

Worldwide, TO is fractionated by distillation to obtain fatty acids (Tall Oil Fatty Acids, known as TOFA), an intermediate mixture (Distillate Tall Oil, known as DTO), rosinic acids (Tall Oil Rosin Acids, known as TORA), fractions that have wide industrial applications and a fractional distillation residue or bottom (Tall Oil Pitch, known as TOP) or simply Pitch.

In a few countries and/or companies, TOS and TO are used directly as an energy source, while TO, and to a greater extent, TOP, are considered as phytosterol sources.

PRIOR ART

Obtaining Neutral Material (NM) and Phytosterols

Various technologies have been developed to recover NM and sterols from various saponified sources, predominantly those that use:

(A) NM Extraction, from a saponified matrix, with a hydrocarbon or ether and/or separation of sterols by formation of an adduct and subsequent release of concentrated sterols from the adduct, as for example in U.S. Pat. Nos. 2,536,753 and 2,568,202 wherein sterols form adducts with various inorganic salts.

(B) NM Extraction from a saponified lipid using a solvent and subsequent crystallization of sterols from the solvent, as in U.S. Pat. Nos. 2,528,025 and 1,912,440.

(C) NM Distillation including released phytosterols, both from saponified or transesterified TOS or TO or TOP and crystallization of NM phytosterols. Among the patents that represent this distillation strategy are: U.S. Pat. Nos. 4,076,700, 6,846,941, 6,297,353, 9,221,869 and WO2003064442.

However, there are few proposals for phytosterol recovery, from any source that contains them, through unit operations other than adduct formation, extraction and/or distillation. Among the few patents that can be mentioned are:

U.S. Pat. No. 2,715,638 that discloses a process for recovery of phytosterols from TOP characterized by the following steps: (a) neutralization of fatty and rosinic acids with aqueous NaOH in brief reflux, (b) separation of a lower aqueous phase which dissolves sodium salts of fatty and rosinic acids, (c) saponification of the upper phase of unsaponifiables mixed with esters of phytosterols with KOH with at least 20% w/w excess over esters of sterols in monohydroxy-alcohol and (d) cooling, crystallization and separation of phytosterols.

U.S. Pat. No. 2,715,639 discloses a process for the recovery of phytosterols from TOP characterized in that it comprises the following steps: (a) saponification of TOP by refluxing with at least 20% w/w excess of KOH over TOP in a water-soluble aliphatic monohydroxy-alcohol, (b) dilution with water and cooling, (c) crystallization and separation of phytosterols. In both patents there is a need to use alcoholic KOH to release phytosterols from their esters. In U.S. Pat. No. 2,715,638 steps are proposed that increase the general operating time with significant heat losses to carry out phase separations and release of phytosterols from their esters, while in U.S. Pat. No. 2,715,639 the difficulty caused by the use of NaOH is shown, in addition, both do not suggest means for the recovery of solvents without distilling, a key step to reduce the operating costs of the process.

On the other hand, the methodologies proposed by U.S. Pat. Nos. 2,715,638 and 2,715,639 collide with reality inside Kraft pulping plants, Tall Oil Soap Recovery, C. Douglas Foran, Arizona Chemical Company, Savannah GA 31402, Dec. 7, 2006, T. Aro, P. Fatehi, Tall oil production from black liquor: Challenges and opportunities, Separ. Purif. Technol. (2016) in which all the salts involved in the processes are sodium. Power generation, an important by-product of pulp mills, increases with the increase in steam pressure and temperature. This increase is limited by accumulation of elements outside the process such as chlorine and potassium. The presence of potassium can generate corrosion and plugging of pipelines carrying streams with concentrations above sensitive limits, so its reuse in these plants is practically impossible, making efforts to eliminate residual levels of potassium in the process from WO2015010179A1, Jimmy Lundström, Sodahuskommittén c/o Ångpanneföreningens Forskningsstiftelse Box 8133, 104 20 Stockholm, Sodahuskommitténs pris till bästa examensarbete inom sulfatmassafabrikens kemikalieåtervinning 2007. Chloride and potassium balances in the future energy efficient pulp mills, Master of Science Polymer Technology Division of the Royal Institute of Fiber Technology of the Department of Polymer Science Division Fiber Institute of Fiber Technology Division of Wood Chemistry and Pulp Technology Stockholm 2007. The foregoing means that the implementation of these technologies should bear the cost of issuing liquid industrial wastes comprising potassium sulfate and other related components.

Patent application WO200132681A1 and U.S. Pat. No. 7,173,144 disclose the saponification and recovery of phytosterol crystals with purities of 95% from crude phytosterols with free acidity less than or equal to 10 and with phytosterols concentrations of 50% or more, that is, they do not consider the raw material (RM) with concentrations of phytosterols below 50%.

RM Characterization

In order to compare the advantages and disadvantages of the different recovery technologies for NM, phytosterols, fatty and rosinic acids and other constituents of both TOS and/or its derivatives, the implementation of analytical techniques that quantify said components both in RM and in its products and by-products is required. The most common ones are described below:

TOS Non-Volatile Material Percentage (% NV). It is determined by a procedure consisting of: i) weighing representative samples of TOS of between 1 and 2 g with a 0.1 mg precision, ii) drying the sample in an oven at 105° C. to constant weight after allowing it to cool in a desiccator, (Pine Chemical Test Method 11, PCTM 11).

NM content in TOS, TO or other saponifiable RM

NM Content in TOS (Dry TOS Base)

NM content in TOS is determined by means of an extraction procedure with a solvent related to NM, such as a mixture of hydrocarbon compounds or even with ethers, considering the SCAN-T 13:74, PCTM 19 or similar methodologies as references mentioned in Leopold Hartman, Hudson Soares Viana and Suely Freitas, Analyst, Vol. 119, 1793-5, August 1994. The procedure used consists of: i) weighing 10 to 20 g of TOS with a known percentage of non-volatile material (% NV) with 0.1 mg precision, ii) dissolving the sample with 3 parts of 2/1 water/ethanol, iii) extracting with 6 parts of hexane 6 times and collecting the organic extracts, iv) washing the extract mixture with portions of 2/1 water/ethanol until neutral to phenolphthalein in the last wash, v) solvent removal from the mixture washed in a balloon with a rotary evaporator at reduced pressure and cool in a desiccator, vi) weighing the NM and expressing the result as % of NM base dry TOS (or Non-Volatile base).

NM Content in TO or Other Saponifiable RMs

It is determined by saponification and hexane extraction (or similar, see the previous reference) of a representative sample. The procedure consists of: i) weighing between 10 and 20 g of TO or other RM with 0.1 mg precision, ii) saponifying by adding 30% by weight of NaOH and 4 to 5 parts by weight of ethanol/water mixture 1/1, iii) keeping the mixture at reflux for at least 3 hours, iv) transferring the saponified mixture to a funnel and extract it following the procedure indicated in the procedure referred to above TOS from step ii) and referring the percentage of NM to the weight of the initial RM.

Tora-Tofa Content in TOS or Other RMs

To determine the content of Tora-Tofa in TOS or in any saponified RM, the mixture of the extracted aqueous-ethanolic fractions and the aqueous washes of extracts left in NM extraction with organic solvents from the previous procedures referred to TOS and its derivatives is required. From said mixture, which contains the Tora-Tofa soaps, the Tora-Tofa (mixture of fatty acids and rosinic acids) is recovered by: a) acidifying this mixture of extracted fractions with 5 to 10% aqueous HCl solution in sufficient volume to bring the mixture to pH 3-4, b) extracting the acidulated mixture 3 times with 3 parts of hexane (hexane extraction) or other hydrocarbons or solvents (see reference cited above), c) collecting the extracts and wash them with water/ethanol 3/1 up to pH 4-5, d) solvent removal from the washed extracts in a rotary evaporator under reduced pressure in a balloon, weigh the mass of Tora-Tofa and e) express the percentage of Tora-Tofa dividing said weight by the initial mass of dry TOS or TO or RM.

Phytosterol Content in Various Arrays

The content of phytosterols is determined in NM, Tora-Tofa, TO or RM (saponified and re-acidulated) by gas chromatography with flame ionization detector (GC-FID) from a chloroform solution of a sample weighing together with an internal standard (which can be cholesterol or some derivative such as cholestane). The sample in purged chloroform solution is derivatized with N, O-Bis (trimethylsilyl) acetamide with pyridine as solvent, injecting 1 μL into a DB-5 column, 30 m×0.25 mm 0.25μ of film thickness or equivalent column with a program of temperature consisting of an isotherm at 280° C. with 1/60 division, with 300° C. in the detector, according to the principles disclosed in Gas Chromatographic Analysis of Plant Sterols Jill Winkler-Moser, USDA, ARS, NCAUR, Functional Foods Research Unit, 1815 N University Street, Peoria, IL 61611, USA DOI: 10.21748/lipidlibrary.40384 https://lipidlibrary.aocs.orq/lipid-analysis/selected-topics-in-the-analysis-of-lipids/qas-chromatographic-analysis-of-plant-sterols.

Saponification of RM Other than TOS

Patent application WO 2008099051A3 specification (though not in its claims) states that TOP saponification with NaOH and water in the absence of co-solvent should be preferably at temperatures between 170 and 195° C. while between 80 and 100° C. may be used in the presence of co-solvent.

Further, U.S. Pat. No. 6,780,831 in example 6 describes TOP saponification from Crude Tall Oil (CTO) from "South East USA" with 10% excess over stoichiometric with 20% aqueous NaOH refluxing at 160° C. for 4 hours.

In the same patent in example 7, the saponification of CTO from "South America *Pinus radiata* Wood" with 6% phytosterols using a 5% excess of a mixture at 30% w/w of NaOH or KOH is described based on the Index Saponification (Pine Chemical Test Methods 16) with slow addition, stirring and heating for 1 hour at 90° C.

While U.S. Pat. No. 3,887,537 saponifies TOP with a NaOH solution with a concentration between 10 and 50% with an excess of up to 20% based on the saponification index. When saponification is difficult, an alcohol with 1 to 6 carbon atoms is added. To achieve total hydrolysis of its esters, it is heated with stirring for several minutes to several hours at a temperature between 80 and 200° C. at a pressure between 0 Kg/cm$^2$ (atmospheric) and 15 Kg/cm$^2$ manometric to produce soaps and unsaponifiables.

Considering that variations may be present between the saponification conditions (for example: lower processing time, or by using less energy, etc.) that allow to achieve in a better way the total release of the neutral material or the absence of phytosterol esters from RMs other than TOS, for the examples shown, these conditions have been chosen from tests that include water with ethanol as co-solvent and a balance between excess alkali, stirring, heating time, solvent/RM ratio and temperature.

The absence of sterol esters in the saponification products can be determined by HPLC techniques such as those described in S. L. Abidi in Chromatographic analysis of plant sterols in foods and vegetable oils published in Journal of Chromatography A, 935 (2001) 173-201, or Jeffrey T. Billheimer Journal of Lipid Research Volume 24, 1646-51 (1983) among others.

Phytosterols Availability from TOS

The TOS is the RM that offers the highest availability of phytosterols expressed in kg of phytosterols per ton of cellulose base, 30-50 kg of TO/ton pulp (Pratima Baypai Chapter 17 "Kraft Spent Liquor Recovery" page 431, Biermann's Handbook of Pulp and Paper (3rd Edition), 2018)), equivalent to 1.5-5 kg NM/ton pulp, (or 0.5-1.6 kg phytosterols/ton pulp) https://www.sciencedirect.com/book/9780128142400/biermanns-handbook-of-pulp-and-paper.

In TOS derivatives such as TO or TOP, re-esterification and/or dehydration reactions occur in the usual storage stages and during fractional distillation which significantly decrease the effective availability of phytosterols.

Although the highest availability of phytosterols is in TOS, the main source of phytosterols nowadays is TOP due to two reasons. Firstly, TO distillation to obtain fatty acids and rosinic acids has a history of more than 100 years wherein facility design was focused on the recovery of these major components and only in the last 30 years demands for TO phytosterols have emerged that have been satisfied from TOP, residue from TO distillation. The cost of TOP at fuel value is further added to the foregoing.

However, it becomes clear that any mass balance of phytosterols from TOS shows that the concentrations of phytosterols in TOP are markedly lower than expected as shown in U.S. Pat. No. 6,107,456. More than half of the b-sitosterol found in TO is destroyed by the high temperatures used to separate TORA from TOFA. Although efforts have been made to produce TOPs with a high phytosterol concentration such as that shown by the examples of U.S. Pat. No. 6,107,456, TORA/TOFA producers have not been able to avoid a loss of 20% of phytosterols without onerous changes in their distillation processes.

Moreover, although the phytosterol concentration in TOP may be greater than 10%, the availability of this last resource is only ⅙ of that of the TOS, P. Fernández, J. M. S. Cabral, Bioresource Technology 98 (2007) 2335-2350 and Coss, J. L., Kutney, J. P., Milanova, R. K., Jollez, P., WO2000064921A2.

Furthermore, no esterified phytosterols have been found in TOS in concentrations higher than traces. F. Vikstrom B. Holmbom A. Hamunen "Sterols and Triterpenyl alcohols in common pulpwoods and black liquor soaps", Holz als Roh- and Werkstoff (2005) 63: 303-308. Therefore, a technological proposal that may efficiently recover NM and phytosterols from TOS, should allow a larger supply of this highly demanded end product.

Phytosterols Availability from TOP

It is known that TO is fractionated starting by separating the fraction with the highest boiling point or that cannot be distilled under process conditions. It has been reported that the residual fraction or Pitch or TOP represents approximately 25% of the distillation plant feedstock (Tall oil production and processing Written by Heather Wansbrough as a combination of two articles from edition one by P J Hooker and L E Fotherby (1977 Chemistry 100 students) and by Malcolm Rough, Senior Process Engineer, KRTA Ltd. respectively, with updated information provided by Stuart Cooney (Eka Chemicals) and with reference to: Grant, Roger and Grant, Claire; Grant and Hockh's Chemical Dictionary (5th ed.); McGraw-Hill Book Company; 1987). Non-esterified sterols are degraded by high temperatures. More than half of the beta-sitosterol is destroyed in the optimization of obtaining TOFA and TORA (Huibers WO2000015652A1). Although in the TO fractional distillation art multiple ways have been proposed to avoid the degradation of phytosterols and/or their co-distillation in the fractions, especially in TORA, many technologies that concentrate phytosterols in TOP try to minimize losses due to degradation by incorporating new steps such as re-esterification of phytosterols in TOP at 185° C., distillation of the remaining TORA/TOFA by feeding at 220° C., bottom saponification at 120° C. and redistillation of the saponified bottom feeding at 270° C., as in U.S. Pat. No. 6,107,456, in a tremendously energy-demanding process and with high chemical resistance equipment. On the other hand, the constant demand for TO derivatives such as TORA or TOFA with a lower color or greater resistance to yellowing is known, as well as lower levels of neutral material (NM) but free of it, due to the limitations that their presence places on some of its industrial applications.

TO for Use in the Lime Kiln.

As mentioned above, TOS is collected in cellulose plants and acidulated to convert it into Tall Oil (TO), a hydrophobic mixture of fatty acids, rosinic acids, and NM that includes species such as phytosterols. Pulp mills usually partially or totally replace the fuel for Lime Kiln operation by TO. The qualities of a fossil fuel which should be matched by a fuel from the Kraft process for use in the Lime Kiln are a relatively high heating value (HV), a minimal water content, desirably zero, a relatively high density, a low viscosity and especially a very low charcoal (ramsbottom charcoal) and ash generation rate since charcoal especially covers the feed nozzles, distorts the shape of the flame torch inside the furnace and complicates the atomization of the fuel, affecting its efficiency in heat generation (Kurzin A V, Evdokimov A N, Trifonova A D "Desulfurization of Tall Oil Pitch", Russian Journal of Applied Chemistry (2014) Vol 87 (3) 299-302, © Pleiades Publishering Ltda 2014).

DESCRIPTION OF THE INVENTION

The present invention discloses a flexible process in selecting the raw material (RM) since TOS and its derivatives may be RM of the process: TO, or distillation bottoms of fatty acids (TOFA) recovery from TO, here called the Basque Bottom (BB), and also the Tall Oil Pitch (TOP) and others in the form of saponified products.

The present invention, whether RM is TOS, TO, BB, or TOP, leads to obtain products derived from TO of better quality than those obtained directly from normal TO, as observed in the results of example 10.

According to the invention, the use of state-of-the-art processes that entail thermal and/or chemical stress, or that dehydrate or degrade or compromise the structural or molecular integrity of the species of interest and generate suspect its use in human food or pharmacological application is prevented.

The present invention preferably uses TOS since an additional advantage is obtained from its use because it does not require saponification. Otherwise, all TOS derivatives mentioned above are used but in saponified form.

As mentioned above, the method of the present invention is flexible in the choice of RM; however, another objective of the present application is to take advantage of the availability of TOS as RM, being indisputably the pulp mill stream that offers the highest phytosterol availability.

As to the raw materials (RM) where saponification is required for use in the present application, RMs such as TO, TOP or BB (distillation bottom to obtain TOFA from TO), the saponification according to the invention is satisfactorily completed with an alkali excess of at least 5% over the Saponification Value, solvent/RM ratio of at least 2.5/1 w/w, with heating to a temperature comprised in the range from 70 to 135° C. for a time of at least 1 hour.

The need to recycle some by-products of Kraft pulp can sometimes lead to a limitation in the base cation to saponify the RM because this process only works with alkalis that contain only $Na^+$ as a cation. Therefore, the present invention can be applied in RM or derivatives that use as a base to saponify those with $Na^+$ ion or $K^+$ ion or others, although preferably the present invention can be applied in RM or derivatives that must be recycled in the Kraft process, using as a base to saponify them those with $Na^+$ ion as the only cation.

By applying the process proposed in the present patent application, it is observed that for the NM recovery and then phytosterols from TOS or its derivatives, the implementation and operation costs leading to NM and phytosterol concentrates are lower compared with the corresponding costs associated with obtaining NM and concentrates of phytosterols of similar characteristics from similar RM according to the prior art, because the proposed process among other reasons, makes use mainly of unit operations with low energy demand and because the solvent recovery is carried out without distilling.

Surprisingly, it has been found that it is possible to separate NM, including sterols, from sodium salts of fatty and/or rosinic acids from various saponified raw materials by dissolving these in a solvent consisting of a mixture of water and ethanol preferably in water/ethanol ratios close to 70/30 w/w; and in which, at the same time, the dissolution corresponds to a ratio of the solvent mixture (water/ethanol) to Tora-Tofa (consisting essentially of fatty acids and rosinic acids) contained in the RM, which is in the range 8/1 to 22/1, more preferably between 14/1 and 20/1 w/w; then cooling preferably below 0° C., and more preferably below −10° C. as seen in Examples 1, 2a, 3a, 3b, 5a and 5b, followed by precipitation and subsequent removal of NM or sterol concentrates, where the concentrations of the sterols in the RM are as low as 5% dry basis.

Surprisingly, it has also been found that it is possible to separate NM, including sterols, from sodium salts of fatty and/or rosinic acids, from various saponified raw materials by dissolving them in a solvent consisting of a mixture of water and methanol preferably in water/methanol ratios close to 60/40 w/w; while the dissolution corresponds to a solvent mixture (water/methanol) to Tora-Tofa (consisting essentially of fatty acids and rosinic acids) ratio contained in the RM in the range from 10/1 to 18/1, more preferably between 12/1 and 16/1 w/w; then cooling preferably under 20° C., and more preferably under 10° C. as observed in examples 2b, followed by precipitation and subsequent removal of NM or sterol concentrates, where the concentrations of sterols in RM are as low as 4% dry basis Even more surprisingly, for initial phytosterol concentrations in the range of 4 to 8% in RM, the application of the process allows obtaining NM-rich streams with a phytosterol concentration between 6.5- and 11-fold higher than the initial concentration in the RM and with a recovery efficiency exceeding 70%.

Refined TO

According to the proposed process, after the precipitate removal from TOS or other saponified RM, a liquid stream remains enriched in fatty and rosinic acid sodium soaps which leads to a Refined Tall Oil by acidulation. This by-product can replace in pulp mills, like its homonym TO (product of TOS direct acidulation), fossil fuels used in the Lime Kiln.

Tables 11a and 11b of Example 11 show that there are no significant differences in HV between normal TO and refined TO from the process claimed in the application while the composition of the latter is more homogeneous, as confirmed by the results from Example 10.2 which aligns it to a combustion with less charcoal generation.

One of the objectives of the present invention is to produce a Refined TO with improved characteristics with respect to the TO obtained by direct TOS acidulation or normal TO in its applications, particularly as fuel for the Lime Kiln and/or as distillation feedstock to produce TOFA and/or TORA with better characteristics than those known from the normal TO derivatives.

Another objective of the present invention is to produce a Refined TO with improved characteristics compared to the TO obtained by direct acidulation of any of the saponified and re-acidulated TOS derivatives, in their applications particularly as fuel for the Lime Kiln and/or as distillation feedstock to produce TOFA and/or TORA with better characteristics than those known from TOS derivatives.

An additional objective of the present invention is to produce a Refined TO with improved characteristics with respect to any acidulated TOS derivative in its applications particularly as fuel for the Lime Kiln and/or as distillation feedstock to produce TOFA and/or TORA of better characteristics than those known from TOS derivatives.

Refined TO Production

The proposed process allows to dispose the refined TOS, after separating the NM rich in phytosterols, in a stream consisting of fatty acid and rosinic acid sodium salts with remaining NM dissolved in a mixture mainly of alcohols and water. Through the proposed process, the refined TOS is found dissolved in the filtrate and/or in the filter cake wash mixture. The refined TO is obtained by acidulation of Filtrate and Cake Washing, both mixed, for example, with 70% sulfuric acid in water until pH 3-3.5. Also by separate acidulation of each stream, refined TO of Filtration (TO ref. of Fil) and/or of Washing (TO ref. of Wash) are obtained. The step to separate the refined TO from the acidulation mixture is indicated below:

i) cooling the acidulated stream to 5° C. (filtrate, wash or mix), centrifuging at 1000 g RCF for 5 minutes and removing a crystalline or translucent aqueous supernatant separated from a heterogeneous bottom (aqueous-organic) rich in TORA-TOFA.

ii) washing the acid heterogeneous bottom by resuspending with 2 parts of cold 3/7 ethanol/water mixture and centrifuging again to collect a new supernatant (wash) and a bottom.

iii) repeating point ii) until the pH of the removed supernatant is 4 or more.

iv) finally, the washed bottom (whether from ref TO from Fil or Wash or the mixture of both) is filtered to remove lignins and the new filtrate is desolventized (from residual solvents) obtaining a refined TO. In laboratory samples, said washed and filtered bottom is transferred to a balloon and dried in a rotary evaporator at 95° C. under reduced pressure until constant weight.

The refined TO, product of the application of the present invention, after acidulation of the liquid phase resulting from the separation of the phytosterol-enriched NM, presents a phytosterol concentration close to ⅓ of the initial concentration or less as shown in Examples 1, 2, 3 and 5 in their respective Tables 1, 2, 3 and 5, and a relative content of NM also lower. In the refined TO, which lacks of phytosterol esters or other fatty alcohols, the characteristics imparted by fatty and rosinic acids predominate, so that, its distillate has a higher acid value (av) than the distillate of a Normal TO obtained under the same operating conditions, while the Gardner color of the refined TO distillate is lower than that of the normal TO distillate, as can be seen in the results of Table 10 of Example 10.

The present invention discloses a recovery method, on the one hand, of neutral lipid components of Tall Oil Soap (TOS) or its saponified derivatives, components that constitute the neutral material (NM) including phytosterols on the one hand, and on the other, the fatty acid and rosinic acid sodium salts that mainly constitute the TOS or its derivatives or saponified RM. This method is based on differences in the solubility of said components in a solvent or in a mixture of solvents from the group consisting of water and alcohols.

The method of the present invention produce a stream that is richer in NM, and particularly in phytosterols, than the dry base saponified RM, whether TOS or its saponified derivatives, and also obtain a stream that is depleted in NM but enriched in fatty acid and rosinic acid sodium salts with respect to RM, also in dry base.

The present invention can be applied to RM such as TOS or its derivatives and which use as saponification bases those with $Na^+$ ion, $K^+$ ion or other cations. More preferably the present invention is applied to RM such as TOS or its derivatives that must be recycled in Kraft processes and that use as saponification bases those with $Na^+$ ion as the only cation.

The method of the present invention comprises the steps:

(a) obtain TOS or saponifying a saponifiable TOS-derived RM until total hydrolysis of the phytosterol esters;

(b) from the TOS or the saponified RM, producing a solution or dispersion of said TOS or said saponified RM in a solvent that dissolves the major components: the sodium salts of fatty acids and/or rosinic acids;

c) from the solution or dispersion obtained in step (b) precipitating a stream enriched in NM and/or phytosterols, non-volatile bases;

(d) separate said precipitate enriched in NM and/or phytosterols, obtained in step (c), from the saponified liquid stream depleted in NM and/or phytosterols;

(e) wash the precipitate separated from step (d) by one or more washes that include one or more solvents that may include water, alcohols, or solvent recovered from the process and recovering a washed precipitate;

(f) recover the saponified liquid streams depleted in NM and/or phytosterols obtained in steps (d) and (e) but more concentrated in fatty acid soaps and/or rosinic acid soaps, depleted, non-volatile base, with respect to the initial TOS or the initial saponified RM. This fraction is called refined TOS (g) acidulate the saponified liquid stream reduced in NM and/or phytosterols, from step (f), using sulfuric acid or sodium sesquisulfate solutions or a mixture thereof, considering in any case: (a) total alkalinity of the liquid stream to calculate the concentrations of the acidulating (b) aqueous solutions of sulfuric acid and/or sodium sesquisulfate concentrations not greater than 70% w/w and 30% w/w respectively and (c) that the pH of the mixture is kept between 3 and 4;

(h) separate the acidulated stream from step (g) into a stream rich in fatty acids and rosinic acids and a used solvent stream containing substantially no fatty acids or rosinic acids;

(i) recover from the stream rich in fatty acids and rosinic acids of step (h) a stream of refined TO essentially free of water, solvent and salts;

(j) recover from the used solvent stream separated in step (h), and containing substantially no fatty acids or rosinic acids, a Recovered Solvent (SR) stream to be reused during the process, for example in steps b), e) or g).

The method is characterized in that in the saponification of the saponifiable RM of step (a), in order to achieve total hydrolysis of its esters, the RM is heated with stirring between 10 and 300 rpm for a time between 5 minutes and 3 hours at a temperature between 80 and 135° C., at a gauge pressure between 0 (atmospheric) and 15 $Kg/cm^2$ and high stirring to produce soaps and unsaponifiable.

The method is characterized in that the solution from step (b) has a solvent/Tora-Tofa ratio, such as soaps, in a range between 10/1 and 22/1 when the solvent comprises ethanol as the sole alcohol. In the same way, the method is characterized in that the solution of step (b) has a solvent/Tora-Tofa ratio as soaps in a range between 10/1 and 16/1 when the solvent comprises methanol as the sole alcohol.

The method is characterized in that the solution or dispersion of step (b) has a pH in the range of 10 to 14.

The method is characterized by considering in the calculation of the solvent/Tora-Tofa ratio of the solution from step (b), the initial Tora-Tofa mass (comprising fatty acids plus rosinic acids) contained in the TOS or in the saponified RM.

The method is characterized in that the solvent mentioned in steps (b) and (e) is a mixture consisting of 2 or more of the following solvents: methanol, ethanol, n-propanol, isopropanol, n-butanol, sec-butanol, tert-butanol, iso-butanol, ethylene glycol, diethylene glycol, diacetone alcohol, and water.

The method is characterized in that the preparation of the solvent in step (b), which consists of a mixture of water and other solvents, the contributions of water and other solvents from the solvents and/or constituents of the solution or dispersion and TOS or saponified RM solutions are considered.

The method is characterized in that in step (c) of precipitation of the solution or dispersion of saponified TOS or RM prepared in step (b), stirring of the soaps solution is performed with low-shear stress stirrers rotating between 10 and 100 rpm for periods of between 20 to 300 seconds followed by times without stirring of between 5 and 60 minutes.

The method is characterized in that the solvent of step (b) consists of a water/alcohol mixture where the alcohol is a monohydric alcohol with no more than 4 carbon atoms and in a ratio between 55/45 to 80/20 w/w.

The method is characterized in that the solvent of step (b) consists of a water/alcohol mixture where the alcohol is a monohydric alcohol of no more than 4 carbon atoms and in a ratio more preferably comprised in the range between 65/35 at 75/25 w/w for ethanol and between 55/45 to 65/35 for methanol.

The method is characterized in that in obtaining the recovered solvent in step (j), distillation and evaporation processes are not required.

The method is characterized in that optionally in step (b) sodium sulfate can be incorporated as shown in example 3.

The method is characterized in that the incorporation of sodium sulfate in step (b) can be carried out by partially neutralizing the alkalinity of the TOS solution or dispersion or its saponified derivatives, up to a pH greater than 8.

The method is characterized in that the addition of sodium sulfate in step (b) by partial neutralization of the alkalinity of the dispersion of TOS or the saponified RM, is carried out using a sulfuric acid aqueous solution or a sodium sesquisulfate aqueous solution, or an aqueous solution of a mixture of them and in which the concentrations of the solutions are no higher than 70% w/w for sulfuric acid and no higher than 30% w/w for sodium sesquisulfate.

The method is characterized in that step (c) of precipitation is carried out by one or a combination of the following operations:

(c1) gradual cooling down to a temperature below 30° C.,
(c2) addition of water or a solvent mixture containing water,
(c3) addition of sodium sulfate to the mixture to be precipitated.

The method is characterized in that the precipitated stream from stage (c) enriched in NM and/or phytosterols is separated in stage (d) by filtration and/or centrifugation.

The method is characterized in that the precipitation and separation of the stage (c) and (d) can be carried out in 2 or more successive steps respectively, at two or more successively descending temperatures for cooling the suspension and where the separated liquid phase of a stage is cooled to a lower temperature than the filtration temperature of the previous stage to form a new precipitate enriched in NM and/or phytosterols.

The method is characterized in that the precipitation and separation in the steps (c) and (d) can be carried out in 2 or more successive steps through cooling to a temperature or by adding water or sodium sulfate or a combination of the above operations, then carrying out in step d) the separation of a first precipitate and a first liquid stream and then proceed with said first liquid stream to a new precipitation step (c) either by cooling to a lower temperature or by further addition of water or addition of sodium sulfate or a combination of the above operations until the appearance of a second precipitate to be removed, separating a second liquid stream even poorer in NM and phytosterols but richer still in dry base fatty acid salts and/or acid salts rosinic while the second precipitate removed is mixed with the first precipitate.

The method is characterized in that the washed precipitate from step (e) can optionally be purified by:

dissolving phytosterols and insolubilizing their contaminants or dissolving its contaminants and insolubilizing the phytosterols or dissolving phytosterols in an immiscible phase with another solvent phase for its pollutants using one or more solvents from the group consisting of Solvent Recovered from the process, methanol, ethanol, n-propanol, isopropanol, n-butanol, sec-butanol, tert-butanol, iso-butanol, hexane, cyclohexane, heptane, methyl-cyclohexane, ethylene glycol, diethylene glycol, diacetone alcohol, acetone, methyl ethyl ketone, methyl isobutyl ketone, ethyl lactate, ethyl acetate, furfural, N, N-dimethylformamide, acetonitrile, dimethylsulfoxide, and water.

Furthermore, the washed precipitate from step (e) can be optionally purified by crystallization, including washing in a solvent mixture comprising water, an alcohol, and a hydrocarbon. The purification step may comprise separating from the washed precipitate, fatty alcohols such as docosanol or tetracosanol, or esters of phytosterols, or residual soaps or concentrating phytosterols from the washed precipitate.

The method is characterized in that the precipitate, consisting of NM washed in stage (e) or optionally purified, can optionally be further purified by short path distillation, distillation in a falling film evaporator, or molecular distillation either by directly feeding the precipitate or mixed with a feed fluid compatible with the feeding (NM), with low vapor pressure, with sensible heat lower or similar to that of the feeding and which previously stripped of distillate by using the same equipment under the same conditions, allows to obtain from the feedstock a distillate enriched in phytosterols. Said distillate is essentially free of soaps, inorganic salts, and heavy metals, complying with the regulations regarding said contaminants in products intended for animal and human consumption, as shown in Example 4.

The method is characterized by that in the purification by distillation of precipitates, consisting of the NM of the alcoholic precipitation, are considered proper feed fluids, in general, those compounds that, present vapor pressure lower than 5 Pa (0.05 mbar) at 220° C., are essentially inert compared to the components of the feed, are compatible or ideally solvents of the entire feed matrix and are resistant to thermal degradation or will not be generating a distillate at operating conditions. In addition, those compounds that due to their polarity are able to dissolve fatty acid soaps, lignins, or concentrations of inorganic salts typical of the Kraft process will be preferable. Many of these compounds are found in families such as triglycerides, fatty acid esters with phytosterols, fatty acid esters with fatty alcohols, fatty acid monoesters with triglycerols or tetraglycerols, esters of dimeric acids with methyl, ethyl, or propyl alcohols, hydrocarbon fractions, isoparaffins with a high flash point, or mineral oils, silicone oils or inorganic compounds or blends with melting point between 100 and 150° C.

The method is characterized in that the precipitate washed in the step (e) and purified by washing or crystallization or enriched in phytosterols by distillation is purified by crystallization in a solvent mixture that includes water, an alcohol with no more than 4 carbon atoms or from the group consisting of methanol, ethanol, and isopropanol and/or a hydrocarbon or mixture of hydrocarbons with no more than 10 carbon atoms, or from the group consisting of hexane, cyclohexane, heptane, and methyl-cyclohexane.

The method is characterized in that from the stream depleted in NM and/or phytosterols of the step (f), but enriched in soaps of fatty acids and/or rosinic acids, a bottom enriched in fatty acids and/or rosinic acids is obtained in the step (g) by acidulation, it is separated in the step (h) to pH 3 to 4 by centrifugation in the range of 100 to 5000 g RCF in a time between 1 and 30 minutes and at a temperature in the range of 0 to 30° C.

The method is characterized in that in the step (i) the recovery of refined TO, essentially free of mineral acidity or residual sulfuric acidity or sesquisulfate and also free of water, solvent, and salts is carried out by neutralizing said residual acidity with NaOH or $Na_2CO_3$ or by washing or by filtration or by centrifugation or by evaporation of residual solvents or a combination of these operations.

The method is characterized in that the Recovered Solvent from the step (j) is obtained by carrying out by neutralizing its free acidity preferably with NaOH or $Na_2CO_3$, cooling under 5° C., crystallization and filtration of sodium sulfate.

The method is characterized in that the phytosterol concentration in the enriched and washed NM precipitate from the stage (e) obtained from TOS or its saponified derivatives that present an initial phytosterol content greater than 4% but lower than 8% w/w is at least 4-fold the concentration in the initial TOS or its dry base saponified derivatives.

The method is characterized in that the phytosterol concentration in the enriched and washed NM precipitate of the stage (e) is 45% or more for aqueous-ethanolic precipitation, from TOS or its saponified derivatives with an initial phytosterol content greater than 6% w/w dry soap base. Similarly, the method is characterized in that the phytosterol concentration in the enriched and washed NM precipitate from the stage (e) is 50% or more for aqueous-methanolic precipitation, from TOS with an initial phytosterol content greater than 4.5% w/w dry soap base. The method is characterized in that the recovery efficiency of phytosterols in the enriched and washed NM precipitate from the stage (e) is at least 65% when the precipitate is obtained from BB with an initial phytosterol concentration greater than 6% w/w.

The method is characterized in that during stage (b) when TOS is used as RM, the water mass from the soap itself is included in the relationships between the constituents of the solution.

The method is characterized in that during the stage (j) of obtaining the Recovered Solvent, it is possible to decrease the solvent's water concentration by forming sodium sulfate hydrates that are separated by filtration (see Example 8) or centrifugation.

The method is characterized in that in step (f), from the First Liquid Phase (Filtering) obtained in the first separation between the precipitate and the liquid, from a solution of the cold saponified RM, an Acidulated First Liquid Phase is obtained in step (g) by acidulation.

The method is characterized in that the step (h) that constitutes a second separation at a temperature lower than 10° C. of the acidulated liquid phase of the step (g) allows obtaining a second, now oily phase of refined TO consisting mainly of fatty acids (oleic, linoleic, linolenic, etc.) and/or rosinic acids (abietic, palustric, levopimaric, etc.) including a residue of mineral acidity and a second aqueous solvent phase with a pH in the range 3 to 4 is also obtained.

The method is characterized in that said second aqueous solvent phase from the step (j) with acid pH, solvent phase with mineral acidity, namely acidity from sulfuric acid or sodium sesquisulfate from the step (h), can be neutralized with NaOH or $Na_2CO_3$ to produce a precipitate of hydrated $Na_2SO_4$ and separate it to finally obtain a third aqueous solvent phase or Recovered Solvent consisting essentially of the initial solvent mixture, avoiding distillation to recover the solvent.

The method is characterized in that the mineral acidity in the stage (h) of the acidulated liquid phase or first oil phase and/or washed oil phase or second oil phase can be neutralized with NaOH or $Na_2CO_3$, producing a neutralized second oil phase.

The method is characterized in that said second oily phase containing the refined TO can be constituted into a refined TO essentially free of mineral acidity, water, solvent, and salts to be used as an energy source, with improved properties compared to those of the original TO in terms of its rheological qualities and those related to the formation of charcoals and maintaining the calorific qualities due to predominance of components that determine said qualities, such as fatty and rosinic acids, by using one or a combination of some unit operations of the group consisting of neutralization, washing, filtration, centrifugation and evaporation of residual solvents.

The method is characterized in that said second oily phase containing the refined TO can be constituted in a refined TO essentially free of mineral acidity, water, solvent, and salts to be used as feed in distillation to separate the fatty acids from the rosinic acids, with improved properties compared to those of the normal TO derivatives in terms of their lower NM content, higher Acid Value and lower Gardner Color due to the predominance of the components that determine said qualities, such as fatty and rosinic acids, by using one or a combination of some unit operations from the group consisting of neutralization, washing, filtration, centrifugation and evaporation of residual solvents.

The method is characterized in that the fractionation of the Refined or refined TO from the step (i) free of mineral acidity allows producing TOFA and TORA fractions with concentrations of fatty acids and/or rosinic acids higher than 90% and concentrations of unsaponifiables or NM lower than 10% and TOFA and/or TORA fractions with Gardner Color lower than 5.

APPLICATION EXAMPLES

Example 1. Obtaining Phytosterol-Enriched NM from TOS (a) Determination of the NM and Tora-Tofa Content of the TOS Used.

Following the methodology indicated in the paragraph that follows the description of the RM, the NM content based on dry TOS is determined as 16.99%, and the dry TOS base Tora-Tofa content is 74.90%. NM is determined by hexane extraction and Tora/Tofa content by acidulation of the extracted soaps to collect NM.

TABLE 1

| Precipitation of NM from TOS in ethanol/water mixture | | | | | | | |
|---|---|---|---|---|---|---|---|
| Test 1.1 | TOS | Dry TOS | Tora-Tofa | Stream | g | Mass % | g |
| 191116 B | g | g | g | | | [sterols] | [sterols] |
| TOS (57.48% NV) | 71.29 | 40.98 | 30.70 | Washed cake | 4.1082 | 45.11% | 1.8487 |
| NaOH | 0.00 | | | Washed ref TO | 0.3586 | 1.41% | 0.0051 |
| Ethanol 96% | 152.54 | 146.44 | | Fil. ref. TO | 30.7816 | 3.26% | 1.0041 |
| Water | 274.71 | 311.12 | | Total | 35.2484 | | 2.8579 |
| Total load | | 498.54 | | Phytosterols in dry TOS | | 6.97% | |

TABLE 1-continued

| Precipitation of NM from TOS in ethanol/water mixture | | | | | | |
|---|---|---|---|---|---|---|
| Test 1.1 | TOS | Dry TOS | Tora-Tofa | Stream | g | Mass % g |
| Water + ethanol | | 457.56 | | % NV TOS | | 57.48% |
| Ethanol/(water + ethanol) | | 0.320 | | Cake/Dry TOS | | 10.00% |
| ethanol/water ratio | | 32/68 | | Recovery efficiency | | 64.69% |
| Solv./Tora-Tofa TOS | | 14.90 | w/w | Filtration temperature | | −10° C. |

In Table 1 (and the following) the heading [sterols] shows the concentration of the five most abundant phytosterols of the RM under test. Phytosterol percentage in dry TOS is determined by dividing the total mass of phytosterols measured by the mass of dry TOS. The third column of Table 1 highlights in bold the final mass of ethanol (100%) and water that includes the water contained in the TOS, in the ethanol, and the addition of 274.71 g of water. The solvent/Tora-Tofa ratio calculated considering that the TOS has a % NV of 57.48% and that the Tora-Tofa is 74.90% of dry TOS also stands out at the end.

(b) Obtaining Phytosterol-Enriched NM from TOS.

A similar sample of TOS was available in a 1 liter beaker (L) with a % NV of 57.48% and a percentage of dry Tora-Tofa TOS base of 74.90%. 71.29 g of TOS are dissolved with 152.54 g of 96% technical ethanol and 274.71 g of water. As shown in Table 1, the resulting control parameters were: solvent/Tora-Tofa ratio equal to 14.9/1 and the ethanol/water mass ratio equal to 32/68. The solution at room temperature with pH 13 was cooled by stirring at 30 rpm for 1 minute (min) every 15 min until reaching the chosen filtration temperature, for example −10° C., generating a precipitate. Said precipitate was retained by filtration on a Büchner funnel of 110 mm diameter (dia.) and Kitasato, with paper and polyester cloth under vacuum. A filtrate was collected. The filter cake was suspended with 1 part of ethanol/water mixture 3/7 w/w TOS base at 0° C., then cooled again to −10° C., filtered and the collected cake washed with 0.5 parts of the same cold mix as above and a washed cake was obtained and the wash mix was collected.

Obtaining Refined TO

The initial filtrate (371 g) with pH 12.64 and the wash mixture were acidulated separately with 70% sulfuric acid in water (7.4 g of solution until pH 3.39 and 0.8 g until pH 3.45 respectively) to obtain refined TO of Filtrate (ref. TO of Fil) and refined TO of Washing (ref. TO of Wash). Then the acidulated streams were cooled at 5° C., centrifuged and a translucent supernatant with pH 3.39 (3.45 for that from washing) free of Tora-Tofa was removed and separated from a heterogeneous bottom (aqueous-organic) rich in Tora-Tofa. Subsequently, the heterogeneous acid bottom was washed by re-suspension with a portion of 3/7 ethanol/water mixture base at 0° C. and centrifuged again at 5° C. to collect a new supernatant (wash) with pH 3.95 (and 4.02 respectively) and a new bottom. The washing operation of the new bottom was repeated and the pH of the resulting withdrawn supernatant was 4.75 (and 4.85 for the final wash of ref. TO wash). Finally, each washed bottom (whether from TO ref from Fil or from Wash) was transferred to a 100 ml balloon and dried in a rotary evaporator at 95° C. under reduced pressure until constant weight.

Washed Cake Recovery

The washed cake was dried in vacuo. The dry cake and both refined TOs were weighed and sampled to determine the profile and phytosterol concentration by Gas Chromatography (GC) with a FID (Flame Ionization Detector) detector. The loads and mass and phytosterol balances of the test are summarized in Table 1, where the phytosterol concentration in the dry base TOS, the phytosterol concentration in the cake, and the recovery efficiency of phytosterols are emphasized.

Solvent Recovery

The supernatant solvent mixture (423 g) resulting from the previous stage of obtaining refined TO was neutralized to pH 8 with 25.5 g of 20% aqueous NaOH and cooled to −10° C. and filtered through fine polyester cloth to retain 18.7 g of hydrated sodium sulfate cake that also contains approximately 15% Lignins and 322 g of filtrate or recovered solvent (RS) free of Tora-Tofa and with a non-volatile percentage of 0.576%.

Example 2. Comparative Examples of Phytosterol-Enriched NM Precipitation from TOS with Ethanol/Water and Methanol/Water Mixtures as Solvent Tables 2a and 2b summarize the parameters and results of the precipitation of NM contained in TOS using mixtures containing ethanol (2a) and methanol (2b) as monohydric alcohol. All the examples were operated in a similar way to example 1.1

TABLE 2a

| Precipitation of NM from TOS in ethanol/water mixture | | | | | | | | |
|---|---|---|---|---|---|---|---|---|
| Examples | [sterols] Dry TOS | Ethanol/ Water Ratio | Solv./Tora Tofa Ratio | Cake mass % | [sterols] Cake | Filtration temperature | Filtration pH | Recovery Efficiency |
| 16B | 6.96% | 32/68 | 14.90 | 11.63 | 45.11% | −10° C. | 13.0 | 64.70% |
| RA 01 | 6.88% | 31/69 | 13.34 | — | 46.50% | −10° C. | 13.5 | 71.00% |
| RA 11 | 4.64% | 42/68 | 10.45 | — | 47.70% | 10° C. | 13.5 | 60.50% |
| RA 15 | 5.30% | 40/60 | 10.60 | — | 53.00% | 10° C. | 13.5 | 68.80% |
| RA 17 | 5.30% | 40/60 | 13.10 | — | 54.20% | 0° C. | 13.5 | 74.20% |

TABLE 2b

| Precipitation of NM from TOS in methanol/water mixture | | | | | | | | |
|---|---|---|---|---|---|---|---|---|
| Examples | [sterols] Dry TOS | Ethanol/ Water Ratio | Solv./Tora Tofa Ratio | Cake mass % | [sterols] Cake | Filtration temperature | Filtration pH | Recovery Efficiency |
| RA 09 | 4.64% | 40.4/59.6 | 13.57 | — | 51.6% | 10 | 13.3 | 68.74% |
| RA 10 | 4.64% | 40.5/59.5 | 13.59 | — | 53.6% | 20 | 13.3 | 57.57% |
| RA 13 | 4.64% | 39.9/60.1 | 13.09 | — | 51.4% | 20 | 13.3 | 63.73% |
| RA 20 | 5.30% | 39.3/60.7 | 13.30 | — | 63.9% | 20 | 13.3 | 66.40% |
| RA 22 | 5.30% | 39.4/60.6 | 15.70 | — | 61.5% | 20 | 13.3 | 71.20% |

Conclusion: Precipitation of NM from TOS in solvent that includes methanol and water is somewhat less efficient and leads to NM of higher sterol concentration without requiring such intense cooling compared to that observed with ethanol dispersions.

Example 3. NM Precipitation from Saponified TO

TO samples from example 3 were saponified at reflux for 3 hours with 30% NaOH by weight TO basis diluting them to approximately 25% in a water/ethanol mixture approximately 1/1 w/w. The saponified mixture was transferred to a 1000 ml beaker washing with ethanol and water, bringing the mixture to the ethanol/water and solvent/Tora-Tofa ratios, indicated in Table 3. The rest of the operation was continued in a similar way as in Examples 1 and 2.

TABLE 3

| NM Precipitation from Saponified TO | | | | | | | | | |
|---|---|---|---|---|---|---|---|---|---|
| Examples | [sterols] TO | Ethanol/ Water Ratio | Solv./Tora Tofa Ratio | Cake mass % | [sterols] Cake | Filtration temperature | Filtration pH | Base TO % $Na_2SO_4$ | Recovery Efficiency |
| 24-A | 6.14% | 29/71 | 19.6 | 6.63% | 56.78% | −9 | 8.4 | 33.59% | 57.55% |
| 24-B | 7.10% | 32/68 | 20.5 | 5.15% | 59.00% | −10 | 7.7 | 33.59% | 45.41% |
| 31-A | 6.45% | 33/67 | 18.2 | 5.79% | 76.47% | −13 | 8.5 | 35.84% | 68.71% |

[sterols] TO: sum of the concentration of (the five main) phytosterols in TO.
Ethanol/water ratio: ethanol/water ratio in the final solvent mixture.
Solv/Tora-Tofa ratio of the RM.
Cake mass %: cake mass relative to the initial dry mass.
[Sterols] Cake: sum of the concentration of (the five main) phytosterols in the dry cake.
Filtration temperature: Filtration temperature in ° C.
Recovery Efficiency: percentage of efficiency in the recovery of phytosterols.
All the examples in this series use partial back acidulation as a way to incorporate sodium sulfate into the medium.

In example 24-A, an example of Filtration at two temperatures to optimize the recovery of NM and dissolution of impurities with a solvent in which the phytosterols are insoluble, a first cake was filtered at 3° C. and the filtrate was cooled to −9° C. and filtered again, recovering a second filtrate. The mixture of both Cakes was suspended with 1 part of water/ethanol mixture 2/1 TO base at 0° C. and after filtering and a wash 1 was recovered. The cake was suspended with 0.5 parts of ethanol at 0° C. TO base and then filtered and a wash 2 was recovered. By acidulation and hexane extraction, refined TOs were obtained from Filtrate, wash 1 and wash 2 whose phytosterol concentrations are respectively 2.4, 3.7 and 3.2%.

In Example 24-B of purification based on dissolution of NM in a solvent mixture and dissolution of impurities in another solvent mixture immiscible with the first, the precipitate was cooled and filtered at −10° C. and a filtrate and a cake were obtained. The cake was washed with 1 part water/ethanol 2/1 TO base at 0° C. and a washed cake and a wash 1a were obtained. The washed cake was suspended in 1 part of ethanol 96% TO base and filtered to obtain a wash 1b. The new washed cake was then dissolved in 3 parts of hexane at 60° C., decanted and the lower milky phase was separated from the hexane phase. The milky phase was dissolved with 1 part of water and contacted 3 times with 3 parts of hexane at 60° C., each time decanted and the hexane phase was separated from wash 2c. The mixture of hexane phases comparable to those preceding the crystallization of phytosterols, was washed twice with 0.5 part of a 2/1 water/ethanol mixture, separating a 2d wash. The washed hexane phase desolventized producing a final Cake. The filtrate and washings were acidulated and recovered by hexane extraction as ref filtrate TO, wash 1 (a plus b) and wash 2 (c plus d). The respective phytosterols concentration were 4.3, 3.9 and 4.3%.

In Example 31-A with purification by phytosterol dissolution and retention of impurities by filtration, the initial retained NM washing stage was started before the end of feeding the precipitate to the filter and the washing consisted of 4 part of water/ethanol 2/1 at 0° C. TO base distributed and a somewhat more dilute filtrate was collected. The semi-washed cake was then washed with 1 part water/1/1 ethanol at 0° C. TO base and a wash was collected. Filtering and washing carried 69 and 17% of the initial dry mass respectively. The NM obtained was dissolved in 17 parts of hexane base NM at 65° C., filtered hot and retained a residue which was washed with 1 part of hot hexane. The hexane filtrate desolventized. The refined TO of the filtrate, wash and residue were recovered by acidulation and hexane extraction with phytosterol concentrations of 1.8, 3.0 and 2.1% respectively.

Although in the examples hexane extraction of acidulated compounds can be used to favor the analytical presentation of the streams involved, its use is not a requirement of the processes of the proposed technology.

It was observed that, in the tests that used saponified TO as RM, the solvent/Tora-Tofa ratio ranged between 18.2/1 and 20.5/1, the ethanol/water ratio ranged between 29/71 and 33/67 and partial retro-acidulation was applied until pH around 8. The phytosterol concentration of the cake turned out to be 55% or more and the recovery efficiency in the same tests was at least 45% and in 2 examples it reaches over 55%.

Example 4 Purification of Phytosterol-Enriched NM by Short Path or Short Path Distillation with Feed Fluid

Example 4a. Preparation of Feed Fluid for Short Path Distillation of NM from TO 200 g of Gardner 5 color refined soybean oil (free of polydimethylsiloxane, citric acid or tert-butyl hydroquinone or their homologs or other additives that either can suffer thermal degradation, or can not be removable via alkaline washing or under the conditions of following distillation, can be distributed between the top distillate and bottom) were heated at 200° C. Said oil was fed to a DCC4 short path still distiller, with a heating surface of 4 dm2 heated to 225° C., with a condenser at 125° C. and a pressure of 10 Pa (0.1 mbar) at a 2 ml/min flow rate and 192 g of Color Gardner 6 distillation bottom were collected which were then cooled with a nitrogen purge at 30° C. and filtered by a Büchner funnel with cloth and paper, previously dried in an oven at 105° C. for 3 hours and with Kitasato and vacuum, obtaining 189 g of oil as filtrate for use as feed fluid (FF).

Example 4b. NM Distillation from BB Aqueous-Ethanolic Precipitation According to Example 5a.5

In a 250 ml balloon connected to a Rotavapor with a glycerin bath heated at 125° C. and gradually reducing the pressure to 100 Pa (1 mbar), 90 g of NM with 51.18% phytosterol concentration from example 5a.5 were dissolved in 45 g of FF, then maintaining the reduced pressure for 45 min. The vacuum was then broken with nitrogen.

From the resulting crystalline mixture and maintained with a nitrogen purge at 125° C., 129.6 g were fed at 2 ml/min flow rate to the same DCC4 still heated to 215° C., with the condenser at 125° C. and with a pressure of 15 Pa (0.15 mbar). 8.70 g of a first yellowish crystalline top with a phytosterol concentration of 18.79% and 120.3 g of a first distillation bottom were collected. 115 g from said first distillation bottom melted into a rotary evaporator with nitrogen purge were fed to the same evaporator previously washed now with the jacket at 225° C., condenser at 125° C. and 10 Pa (0.10 mbar) and 62.9 g were collected of a second top with a 64.33% phytosterol concentration and a second bottom which, by saponification, hexane extraction of the saponified and solvent removal of washed extracts, showed less than 2% of phytosterols based on the second bottom. The second top represented a recovery of 91.9% of fed phytosterols and was essentially free of soaps, inorganic salts and heavy metals, complying with the regulations regarding said contaminants in products destined for animal and human consumption.

All the details of both the feed fluid preparation and the 2 stages of the short path distillation are shown in Table 4.

TABLE 4

Distillation to prepare FF (4a) and NM distillation with feedstock fluid in 2 stages (4b1 and 4b2).

| Test | 4a | 4b1 | 4b2 |
|---|---|---|---|
| Feeding | Soybean oil | NM mixture (51.18% Phytosterols)/ Bottom 4a = 2/1 | Bottom 4b1 |
| Feed Temperature | 200° C. | 125° C. | 125° C. |
| Jacket Temperature | 225° C. | 225° C. | 225° C. |
| Condenser Temperature | 125° C. | 125° C. | 125° C. |
| Feed Flow rate ml/min. | 2 | 2 | 2 |
| Pressure [Pa] | 10 | 15 | 10 |
| Fed mass [g] | 200 | 129.6 | 115.0 |
| [phytosterols] initial | | 34.18% (mixture) | |
| Bottom Mass [g] | 192 | 120.3 | |
| [phytosterols] final | | | <2% |
| Top Mass [g] | — | 8.7 | 62.9 |
| [phytosterols] final | | 18.7% | 64.33% |
| Recovery efficiency | | | 91.89% |

Example 5. Precipitation of Phytosterol-Enriched NM from TO BB (Residue of TO Distillation Leading to TOFA) Saponified, with or without Partial Acidulation (a) Content of NM and Tora-Tofa in TO BB.

Following the methodology indicated above to determine NM by means of hexane extraction of saponified TO and the content of Tora/Tofa by acidulation of the extracted soaps to collect the NM, it was obtained that the NM content BB base was 15.66%, and the Tora-Tofa content base BB was 82.14%.

BB samples were saponified with 0.32 parts of NaOH on a BB base weight refluxing in 3.4 parts by weight of 1/1 water/ethanol mixture. The saponified BB samples presented variable levels of free phytosterols. Table 5a shows examples of NM precipitation without retroacidulation. Table 5b shows tests with moderate partial retro-acidulation (pHs not lower than 11) with 50% aqueous sulfuric acid). In both series, an abundant precipitate was observed with filtration temperatures varying between −12 and 3° C. (without retroacidulation) and between 3 and 18° C. (with retroacidulation). The results of examples without retroacidulation (Table 5a) were comparatively more efficient by about 10 percentage points more than those with retroacidulation (Table 5b).

TABLE 5a

NM precipitation from BB (from TO) Saponified, solution pH 13-14

| Examples | [sterols] in BB of TO | Base BB % NaOH | Ethanol/Water Ratio | Solv./Tora Tofa Ratio | Cake % | [sterols] In Cake | Filtration temperature | Sterols % recovery |
|---|---|---|---|---|---|---|---|---|
| 5a.1 | 13.72% | 32.77% | 29/71 | 15.08 | 19.01% | 55.72% | −5 | 72.36% |
| 5a.2 | 14.04% | 32.26% | 35/65 | 14.33 | 20.42% | 52.93% | −2 | 73.55% |
| 5a.4 | 10.50% | 46.01% | 20/80 | 9.53 | 11.71% | 52.73% | 3 | 58.82% |

TABLE 5a-continued

NM precipitation from BB (from TO) Saponified, solution pH 13-14

| Examples | [sterols] in BB of TO | Base BB % NaOH | Ethanol/Water Ratio | Solv./Tora Tofa Ratio | Cake % | [sterols] In Cake | Filtration temperature | Sterols % recovery |
|---|---|---|---|---|---|---|---|---|
| 5a.5 | 8.66% | 31.07% | 29/71 | 14.31 | 10.86% | 43.51% | 3 | 55.70% |
| 5a.6 | 11.95% | 30.61% | 23/77 | 17.55 | 12.96% | 66.02% | −12 y 3 | 71.58% |

Cake Washes and Recovery:

In example 5a.1 the cake was washed with 2.6 parts of TO base water/ethanol 7/1 at 0° C. In example 5a.2 it was washed with 0.5 parts of 3/1 w/w water/ethanol 6 times at 0° C. In 5a.4 it was washed with 1 part of water/ethanol 2/1 w/w at 0° C. In example 5a.5 the cake was washed with 6 parts of 3/1 w/w water/ethanol at 0° C., reaching the indicated purity. After dissolving the washed cake in 7 parts of hexane and washing the solution 3 times at 70° C. with 0.05 parts of 3/1 water/ethanol mixture, relative to the volume of the hexane solution, and removing the solvent, said purity rose to 51.18%.

In example 5a.6, the BB saponified and partially retro-acidulated to pH 8.5 generated a precipitate at −12° C. which was filtered off. By alkalinizing the suspension of the retained cake with 4 parts of water/ethanol 6/1 containing 2% NaOH at 5° C., filtration and washing by resuspending the cake with 2 parts of water/ethanol 3/1, a filtrate and a cake with a concentration of 62% of phytosterols were obtained. The filtrate was re-alkalinized, cooled to 3° C. and filtered, recovering also by means of double suspension in 3/1 water/ethanol at 5° C. and filtration, a second cake with a 70.4% phytosterol concentration which is equivalent to a final cake with 66.02% of phytosterols and overall recovery efficiency of 71.8%. Both cakes by hexane recovery of NM and Cake Tora/Tofa reached a global concentration of phytosterols of 75.6% in the NM and recovery efficiency of 71.5%.

Hexane extractions do not determine an increase in Cake base purity or Cake recovery efficiency but allow access to more precise quantification samples.

TABLE 5b

NM precipitation from BB (from TO) Saponified, solution pH 11.3-11.5
In this series of examples the initial concentrations of phytosterols were on average lower than in the previous series. The phytosterol concentration retained in the filtrate and washes were close to 3%.

| Test | [sterols] in BB of TO | % NaOH base BB | ethanol/ water ratio | Solvent/ Tora-Tofa ratio | % Cake | [sterols] in Cake | Filtration ° C. | % $Na_2SO_4$ | Sterols % recovery |
|---|---|---|---|---|---|---|---|---|---|
| 5b.1 | 9.76% | 46.01% | 23/77 | 13.74 | 12.49% | 56.37% | 4° C. | 32.7% | 62.87% |
| 5b.2 | 7.76% | 46.01% | 20/80 | 9.51 | 13.58% | 44.56% | 3° C. | 52.5% | 65.63% |
| 5b.3 | 11.38% | 30.61% | 27/73 | 10.68 | 11.82% | 55.32% | 18° C. | 33.3% | 60.20% |

In addition to control parameters (solvent/TO ratio and ethanol/water ratio) other factors may influence the result including: alkalinity, pH, presence of $Na_2SO_4$, excess NaOH, etc. which offers alternatives to optimize the process for each type of RM.

Example 6. Recirculation of Recovered Solvent

The series that constitute Example 6 was started with Example 6.1, and started with the saponification in a 250 ml Erlenmeyer flask of a 25.8 g sample of BB (FFA distillation bottom from TO, mixture of BB1 and BB2 from example 9) with 7.90 g of NaOH, 9.72 g of 96% ethanol and 33.8 g of water by refluxing for 3 hours. The saponified mixture was poured into a 1000 ml beaker by dragging and washing the Erlenmeyer flask with ethanol and water, completing the loads that satisfied the design (solvent/Tora-Tofa=15.05/1 and ethanol/water ratio 29/71). The solution with pH 13.5 was cooled by stirring at 30 rpm for 1 minute (min) approximately every 15 min until reaching −7° C., generating a precipitate. By filtration with Kitasato/Buchner and paper/polyester cloth and vacuum, a cake consisting of Phytosterol-enriched NM was retained and a filtrate was obtained. The retained cake was washed with 3/7 w/w portions of ethanol/water mixture totaling 116 g resulting in the washed cake (about 6.8 g) and a filtered wash. The cake was washed and dried in an oven at 102° C. up to constant mass weighed of 3.7317 g and was sampled for gas chromatography (GC-FID). The mixture of Filtrate and washings (424 g) was collected in a 1000 ml beaker, acidulated to pH 2.85 with 19.3 g of $H_2SO_4$ 50.08% in ethanol/water mixture 29/71 and the acidulated mixture was cooled until 5° C. shaking at 30 rpm by 15 min. The cold acidulated mixture was centrifuged at 1400 g RCF for 3 minutes and 374 g of supernatant with pH 3.85 and essentially free of acidulated soaps and 49 g of centrifugation bottom were recovered. Mineral acidity was removed from this bottom by neutralizing it to pH 4-5 with a 10% $Na_2CO_3$ solution in water, which was then solvent removed in a Rotavapor, collecting 20 ml of a 3/7 ethanol/water distillate and a bottom essentially free of mineral acidity and water. This new bottom of approximately 30 g was filtered on a Büchner funnel with vacuum retaining a salt cake which was washed with 5 ml of heptane. The filtrate was solvent removed in Rotavapor, recovering the heptane and 21.8951 g of BB refined TO essentially free of mineral acidity, water, solvent and salts. The use of heptane only responds to the need to carry out the mass balance of refined TO, not constituting a process requirement. The acidic supernatant was neutralized with NaOH dissolved in 3/7 ethanol/water to pH 7 and cooled to −5° C. with stirring at 30 rpm by 15 min. The cold and neutralized supernatant was filtered on Büchner/Kitasato and paper/polyester cloth with vacuum retaining 68.5 g of a cake consisting mainly of hydrated sodium sulfate with some occluded solvent and with a NV of 20.47% and also obtaining 302 g of filtrate or Recovered Solvent (RS), almost colorless, with a NV of 0.535% and a content of 71.35% of water. A summary of the characteristics of the process is shown in Table 6a.

TABLE 6a

| Example 6.1 | g | | TO in BB 6 g | | G | [5 sterols] | 5 sterols g |
|---|---|---|---|---|---|---|---|
| BB1/BB2 mixture example 9 | 25.80 | | 20.57 | Wash Cake | 3.7317 | 54.79% | 2.0446 |
| NaOH | 7.90 | 7.90 | | Filtrate | 21.8951 | 3.72% | 0.8146 |
| Ethanol 96% | 93.53 | 89.79 | | Total | 25.6268 | | 2.8592 |
| Water | 216.02 | 219.82 | | Filtration temperature | | −7 °C | |
| | | | | Conc. Phytosterols BB | | 11.08% | |
| Water + ethanol | | 309.62 | | Recovery efficiency | | 71.51% | |
| ethanol/( Water + ethanol) | | 0.290 | | Fil + Wash + Acidulation | | 443 g | |
| Water/ethanol ratio | | 29/71 | | Hydrate Sulfate Cake | | 68.5 g | |
| Solv/Tora-Tofa ratio | | 15.05 | | Recovered Solvent | | 302 g | |

Table 6a shows example 6.1 in detail and the final mass of ethanol (100%) and water is highlighted in bold. The solvent/Tora-Tofa ratio calculated considering the Tora/Tofa mass (79.71%) of the initial BB also stands out at the end.

Table 6b presents a summary of the results of the series with repeated use of recovered solvent (RS)

In the following test, 6.2, the sequence was repeated, also saponifying 25.8 g of BB with 7.9 g of NaOH, and using 44 g of RS resulting from the previous test as a means to reflux and then with 256 g of RS, completing load according to design. The process was completed in the same way as in test 6.1 and the sequence was repeated twice more with tests 6.3 and 6.4. The pH of the initial dispersion was between 13.1 and 13.3 while the content of sodium sulfate in the recovered solvent (RS) used was less than 0.6%. The following table presents the results per test that show the feasibility of reusing the recovered solvent (RS) in the precipitation of NM from the process where said RS is obtained in the recovery stage of the refined TO without requiring its distillation.

TABLE 6b

NM Precipitation from BB Saponified with Recovered Solvent

| Test | [sterols] in BB | NaOH % b/TO | Ethanol/water ratio | Solv/Tora-Tofa ratio | % Cake in BB | [sterols] Cake | Filtration temperature ° C. | Sterols % recovery |
|---|---|---|---|---|---|---|---|---|
| 6.1 | 11.08% | 30.61% | 29/71 | 15.05 | 14.6% | 54.79% | −7 and -5 | 71.51% |
| 6.2 | 14.39% | 30.63% | 27.4/71.6 | 16.91 | 16.2% | 63.08% | −12 | 71.62% |
| 6.3 | 15.33% | 30.63% | 28.1/71.9 | 13.33 | 17.2% | 66.81% | −16 | 74.43% |
| 6.4 | 12.97% | 30.60% | 28.8/71.2 | 15.49 | 19.4% | 51.48% | −16 | 78.58% |

Example 7 Comparative Use of Sodium Sesquisulfate ($SSNa_3$) and Sulfuric Acid ($H_2SO_4$) as Acidulants These acidulation tests were designed considering the residence times of the reactants in a standard TOS acidulation plant with a reactor volume estimated at 300 liters and total flows of 4450 liters of reaction mixture/h at 105° C.

Example 7a. Comparative Acidulations of TOS with $SSNa_3$ and $H_2SO_4$

Test 7.1 Acidulation of TOS with Sodium Sesquisulfate.

60.00 g of TOS with Total Alkalinity (TA) 59.994 mg NaOH/g of TOS, NV 55.76% were weighed into a 500 ml Erlenmeyer flask with a ground-glass mouth fitted with a magnetic stirrer and suspended with 100 ml of water at 50-60° C. 66.54 g of an approximately 30% hot (60-70° C.) solution of Sodium Sesquisulfate ($Na_3H(SO_4)_2$), Acid Value (AV) 212.88 and Purity 99.40%) were added, which represents an excess of 3.57% acidity compared to TOS alkalinity. A condenser and thermometer (thermocouple) were attached to the flask, the mixture was brought to 105° C. and kept stirring at 180 rpm for 4 min. The mixture was cooled to around 60° C. by adding 50 ml of cold water stirring at 60 rpm to avoid emulsifying and it was centrifuged at 1400 g RCF for 3 min and 3 phases were separated: upper phase formed by TO, intermediate phase formed by aqueous brine and lower phase of fibers, lignins and remains of dust. The pH of the re-suspended upper phase was measured with 50 ml of 2/1 water/ethanol and the TO content was determined by extraction with hexane and solvent removal under reduced pressure. The pH of the aqueous phase was measured directly and the TO content was determined by extraction with hexane and solvent removal under reduced pressure. The lower phase was mixed and resuspended with 50 ml of water/2/1 ethanol, the pH was measured and the TO content was determined by extraction with hexane, filtration of the extract and washing of the fiber cake, lignins and dust. with 2/1 portions of water/ethanol, solvent removal of the TO/solvents mixture under reduced pressure, drying of the cake in an oven at 103° C. and weighing the recovered TO and the fibers, lignins and dust to close the mass balance.

Test 7.2 Acidulation of TOS with Sodium Sesquisulfate.

The test was repeated in the same way as Test 7.1, but the reaction time at 105° C. was increased to 6 minutes.

Test 7.3 Acidulation of TOS with Sodium Sesquisulfate.

The test was repeated in the same way as Test 7.1 but the Sesquisulfate solution was increased to 68.74 g dissolved at 30% in water, which represents an excess of 7% over TOS alkalinity.

Test 7.4 Acidulation of TOS with Sulfuric Acid.

Test 7.1 was repeated in the same way, but Sesquisulfate was changed for 6.52 g of 70% aqueous $H_2SO_4$ which represents an excess of 3.57% over TOS alkalinity.

Table 7a shows the results that demonstrate the feasibility of using sodium sesquisulfate as acidulant for TOS.

TABLE 7a

| Acidulation of TOS Comparative with Sesquisulfate and Sulfuric Acid | | | | |
|---|---|---|---|---|
| Test | 7.1 | 7.2 | 7.3 | 7.4 |
| acidifier | $Na_3H(SO_4)_2$ | $Na_3H(SO_4)_2$ | $Na_3H(SO_4)_2$ | $H_2SO_4$ |
| % molar excess | 3.57 | 3.57 | 7.00 | 3.57 |
| Time (minutes) | 4 | 6 | 4 | 4 |
| Dry TOS | 33.46 g | 33.46 g | 33.46 g | 33.46 g |
| TO = 31.06 g Phase | pH | pH | pH | pH |
| Top (g) | 29.35 | 30.61 | 30.92 | 30.92 |
| | pH = 5.85 | pH = 5.2 | pH = 5.15 | pH = 4.75 |
| Intermediate (g) | 0.11 | 0.11 | 0.00 | 0.00 |
| | pH = 2.01 | pH = 2.08 | pH = 2.95 | pH = 3.35 |
| Bottom (g) | 1.46 | 0.83 | 0.63 | 0.63 |
| | pH = 5.75 | pH = 5.18 | pH = 5.15 | pH = 4.75 |
| % recovered TO * | 94.5% | 98.6% | 99.6% | 99.6% |

* TO recovered with respect to the expected TO contained in the TOS.

Example 7.b Acidulation of Filtrate with Sodium Sesquisulfate and $H_2SO_4$

Test 7.5 Acidulation of Filtrate with Sodium Sesquisulfate 480 g of alkaline Filtrate solution from Test 1.1 characterized by a NV of 6.723% and a Total Alkalinity (TA) of 7.916 mg NaOH/g were available. In a 500 ml Erlenmeyer flask equipped with a magnetic stirrer, 160 g of said solution were weighed and 23.17 g of sodium sesquisulfate dissolved 30% in water were added which represents an excess of 2.5% of TA base filtering acidity. A condenser was connected to the flask and the mixture was refluxed, thus being held for 4 min with stirring at 120 rpm. The boiling point was limited by the presence of ethanol. At the end of the time the mixture was cooled to around 65° C. and centrifuged at 1400 g RCF. A phase separation was produced consisting of: a slightly cloudy or supernatant aqueous upper phase and a lower or bottom semisolid phase. The supernatant and the bottom were collected. The pH of the supernatant was measured directly and the TO content was determined by extraction with hexane and solvent removal. The pH of the re-suspended bottom or bottom phase was measured with 50 ml of 2/1 water/ethanol and the TO content was determined by extraction with hexane.

Test 7.6 Filtrate Acidulation with Sodium Sesquisulfate

This example repeats the steps from Example 7.5, changing the mass of sodium Sesquisulfate to 23.73 g dissolved 30% in water, which represents a 5% excess over the Total Alkalinity (TA) of the Filtrate.

Test 7.7 Filtrate Acidulation with Sulfuric Acid

This example repeats the steps from Example 7.5, changing the mass of sodium Sesquisulfate with 2.27 g of $H_2SO_4$ 70% in water, which represents an excess of 2.5% over the stoichiometric according to AT of the Filtrate. Table 7b shows the results of the comparative tests of filtrate acidulation with sodium sesquisulfate and sulfuric acid.

TABLE 7b

| Comparative Filtrate Acidulation with Sodium Sesquisulfate and Sulfuric Acid | | | | |
|---|---|---|---|---|
| Test | | 7.5 | 7.6 | 7.7 |
| acidifier | | $Na_3H(SO_4)_2$ | $Na_3H(SO_4)_2$ | $H_2SO_4$ |
| % excess | | 2.5 | 5.00 | 2.5 |
| Contact time (minutes) | | 4 | 4 | 4 |
| TO Total recovery | 10.06 | TO g | TO g | TO g |
| phase | | pH | pH | pH |
| Supernatant | | 0.18 | 0.05 | 0.02 |
| | | 2.08 | 2.98 | 3.37 |
| Bottom | | 9.68 | 10.01 | 10.04 |
| | | 5.08 | 4.25 | 4.65 |
| % TO recovery | | 96.2% | 99.5% | 99.8% |

base TO recovered Total

Example 8. Use of $Na_2SO_4$ to Modify Ethanol/Water Ratio in Recoverable Solvent (RS)

The acidic supernatant was neutralized with NaOH dissolved in 3/7 ethanol/water to pH 7 and cooled to −5° C. with stirring at 90 rpm every 15 min. The cold and neutralized supernatant was filtered on Büchner/Kitasato and paper/polyester cloth with vacuum retaining 68.5 g of a cake consisting mainly of hydrated sodium sulfate with some occluded solvent and with a NV of 20.47% and also obtaining 302 g of Filtrate or Recovered Solvent, almost colorless, with a NV of 0.535% and a content of 70.9% of water measured in dilutions of the sample in anhydrous methanol. A summary of the process characteristics is shown in Table 8.

TABLE 8

| Solvent recovery tests from acidulated filtrate centrifugation supernatant | | | | | | | | |
|---|---|---|---|---|---|---|---|---|
| Test | RM | A $Na_2SO_4$ by H2SO4 | B Cake NV $Na_2SO_4$ hydrate | C Cake g $Na_2SO_4$ hydrate | D Solvent g Recovered | E NV SR Neutralized | F % ethanol Initial mixture | G % ethanol Final Mixture |
| 8.1 | BB from TO | 13.53 | 20.5% | 50.84 | 534.1 | 0.585% | 32.6% | 34.59% |
| 8.2 | TOS | 8.05 | 20.5% | 39.24 | 322.1 | 0.585% | 33.5% | 36.21% |
| 8.3 | BB from TO | 15.90 | 41.2% | 38.64 | 366.5 | 0.659% | 32.65% | 34.72% |
| 8.4 | BB from TO | 10.99 | 35.7% | 30.77 | 252.6 | 0.520% | 28.77% | 30.99% |
| 8.5 | TOS | 36.39 | 32.10% | 113.38 | 727.6 | 0.542% | 31.13% | 34.31% |
| 8.6 | TOS | 7.26 | 25.10% | 28.94 | 338.5 | 0.520% | 22.70% | 24.04% |

RM: raw material

Column A represents the g of anhydrous $Na_2SO_4$ generated by acidulation with $H_2SO_4$ of the Filtrate corresponding to the test in Table 8, column B shows the NV % of the hydrated sodium sulfate cake recovered in the filtration leading to Recovered Solvent and C the g of said cake. The mass of Recovered Solvent appears in D and the % of NV in E. Finally, in F and G, the ethanol concentration (in a salt-free ethanol/water mixture) in the initial solvent and in the Recovered solvent, respectively.

In tests 8.2, 8.5 and 8.6 the mass of water entrained with the sulfate cake generated by acidifying the filtrate is similar to or greater than the mass of water provided by the TOS in such a way that, by using the Recovered Solvent, it is possible to carry out equivalent successive processes, maintain the control parameters (solvent/TO ratio and ethanol/water ratio in the solvent) and replicate the volumes to be processed. It may be necessary only occasionally and in a minimal proportion to add some component of the solvent to adjust the control parameters. The low residual level of $Na_2SO_4$ is also observed in the Recovered Solvent resulting from the removal of hydrated sodium sulfate from the Neutralized (from Centrifugation Supernatant) that comes from the initial Acidulated Filtrate. The $Na_2SO_4$ concentration in the Recovered Solvent is close to 0.5% by weight.

Example 9 Obtaining BB from TO with Minimal Degradation of Phytosterols

TABLE 9

| TOFA distillation from TO in DCC4 correction 201122 | | | | | |
|---|---|---|---|---|---|
| current (co) | Dry TOS | TO | BB1 | BB2 | BB3 |
| Jacket temperature [° C.] | | | 150 | 155 | 155 |
| feed flow [ml/min] | | | 1.5 | 1.5 | 1 |
| pressure [Pa] | | | 20 | 20 | 20 |
| roller speed [rpm] | | | 180 | 180 | 180 |
| mass % base (b) dry TOS | 100.00% | 94.31% | 61.03% | 53.13% | 44.47% |
| % sterols (st) in current | 6.62% | 6.88% | 10.50% | 11.95% | 14.04% |
| % st b TOS se | 6.62% | 6.54% | 6.41% | 6.35% | 6.24% |
| % st b st of TO | | 100.00% | 98.51% | 97.60% | 95.98% |
| % st b st of TOS | 100.00% | 98.01% | 96.80% | 95.91% | 94.31% |
| Steradienes [ppm] | | 384 | 1013 | 1158 | 5882 |
| column | a | b | C | d | e |
| mass % base (b) dry TOS | bottom mass percentage relative to initial dry TOS | | | | |
| % sterols (st) in the co | phytosterol concentration in the stream | | | | |
| % st b TOS se | percentage of free phytosterols in dry TOS base stream | | | | |
| % st b st of TO | percentage of phytosterols in the base stream phytosterols in TO | | | | |
| % st b st of dry TOS | percentage of phytosterols in the base stream phytosterols in dry TOS | | | | |

Table 9, with its columns a) to e), represents a summary of the art related to a better use of the availability of phytosterols according to the type of RM available from experiments of the application using a 4 dm2 DCC4 (short path distillation equipment) under the indicated conditions feeding a typical TO:

Column a) shows a TOS, with 6.62% of dry TOS base phytosterols, which led to obtaining, by acidulation, a TO, column b), with 6.88% of phytosterols, which referred to Initial TOS corresponds to 98.01% of the initial phytosterols.

In a DCC short path still with 4 dm2 of heating area heated at 150° C., a sample of said TO was fed with 6.88% of phytosterols at a flow of 3 ml/min, to eliminate trace levels of water and volatiles at 2000 Pa (20 mbar) and at 150° C., collecting a distillate corresponding to 8% of the feed and with less than 0.5% of phytosterols and a first bottom.

This first bottom was then fed into the same DCC4 short path still according to the conditions indicated in Table 9: in columns c) and d) at a flow of 1.5 ml/min (0.375 ml/min*dm2), and in column e) at a flow rate of 1 ml/min (0.25 ml/min*dm2). In each case, a second distillate and 3 qualities of Bottom BB (BB) were obtained where a slight decrease in the initial free phytosterols TOS base is observed between 6.41 and 6.24% although the BB base concentration increases from 6.88% to 14.04% depending on the case.

Table 9 shows that even when the maximum availability of phytosterols comes from the use of TOS as RM, obtaining BB represents an enormously advantageous alternative when the initial RM is TO, because for NM and phytosterol recovery according to the invention among other reasons about half of the soda is required and a better use of the facilities is achieved compared to the case of using TO as RM, having between 94 and 97% of the phytosterols initial free TOS but in the form of a BB with a phytosterol concentration between 58% and 112% higher than the initial one. The bottom thus obtained allows after saponifying, suspending and recovering a NM precipitate with a phytosterol concentration around 50%, according to examples in Table 5a, a concentration suitable to crystallize and obtain pure phytosterols.

It should be noted that the initial TO does not contain more than 400 ppm of steradienes while the BB1 and BB2 obtained showed less than 1,200 ppm of steradienes and only the BB3 presented slightly less than 6,000 ppm (0.6%) which should not be surprising given the short residence time of the feed in the still. On the other hand, the small drop in the phytosterol content may be associated with co-distillation with TOFA since the latter did not present significant steradiene concentrations.

Example 10. Comparative Distillation Between Normal TO and Refined TO

The following example shows the ability of the present invention to obtain derivatives by TO fractionation with better properties of interest in its applications.

Example 10.1

In a short path still with 400 $cm^2$ heating surface heated at 160° C., with Roller at 300 rpm, at reduced pressure at 0.133 kPa and condenser at 80° C., 685.6 g of Normal TO were fed with a content of five major phytosterols of 6.43% at a flow of 1.5 ml/min. 366.5 g of a Gardner 12 color distillate AN 170.9 were collected at the top, which included 55.3% of fatty acids in its composition. 312.3 g of viscous and dark bottoms (BB) were recovered from the bottom, which contained 13.72% of the major phytosterols and which constituted 45.5% of the feed.

TABLE 10

Comparative distillations of Normal and Refined TO

| Test | 10.1 | 10.2 | 10.3 | 10.4 |
|---|---|---|---|---|
| Head g | 0.9 | 2.2 | 41.0 | 40.1 |
| Distillate g | 366.5 | 598.2 | 207.8 | 213.3 |
| BB or Pitch g | 312.3 | 424.7 | 92.0 | 80.0 |
| TO Alim g | 685.6 | 1043.4 | 342.8 | 334.4 |
| Jacket Temperature | 160° C. | 180° C. | 155 y 174° C. | 155 y 174° C. |
| Pressure kPa | 0.133 | 0.133 | 0.117 | 0.117 |
| Flow ml/min | 1.5 | 1.5 | 1 | 1 |
| Headless distillate | 53.5% | 57.3% | 60.6% | 64.1% |
| Color Gardner | 12 | 11 | 7-8 | 3 |
| Acid Value | 170.90 | 168.33 | 176.12 | 183.02 |
| % TOFA | 55.3% | 53.7% | 50.0% | 45.3% |
| BB or TOP | 45.5% | 40.7% | 26.8% | 23.9% |
| % 5 sterols | 13.72 | 11.39 | 14.04 | 6.02 |

Test 10.2

As shown in Table 10, in test 10.2, 1043.4 g of the same TO were fed, only changing the jacket temperature to 180° C. which produced a percentage increase in the distillate with little variation in color and AV. However, phytosterol concentration did not increase proportionally to the percentage mass decrease in the BB.

Test 10.3

In this case, 362 g of the same TO was initially fed (for the mass balance, 342.8 g are considered) to the still with Jacket at 155° C., condenser at 80° C., 0.117 kPa of reduced pressure and at a flow of 1 ml/min. 43.5 g of a first distillate consisting of a mixture of light NM and TOFA were collected from the top (41.0 g are considered for the mass balance) while, from the bottom, 318.7 g of a more viscous composition than TO. Then, the Jacket was brought to 174° C. in a second stage and 301.8 g of this bottom were fed, keeping the still at the same pressure and feed flow as in the previous stage, collecting 207.8 g of a second Gardner color 7-8 distillate and 92.0 g of a residue or TOP with a phytosterol content of 14.04%. This residue represents 30.5% of the load at the beginning of the first stage while the first distillate corresponds to 13.6% of said load.

Test 10.4

In this case, the operation was repeated in two stages and under the same respective conditions as shown in test 10.3 of Table 10, but this time feeding a refined TO obtained from a NM recovery test that allows reducing the phytosterols in the refined TO obtained from the Filtrate at approximately 30% of the initial concentration and the remaining NM at 1/3 of the initial concentration. 347.3 g of said refined TO were fed (although 334.3 g are also considered for the balance that includes the two stages) and 43.3 g of a first distillate or head consisting of a mixture of Light NM and TOFA (although 40.1 g were also considered for the balance). 301.0 g of a resinous and viscous product were recovered from the bottom, from which, when the Jacket was at 174° C., 294.3 g were taken and fed. 213.3 g of a second distillate with a lower Gardner color (3) and a higher AN than in all the previous cases were collected.

Example 11 Quality of the Refined TO as Fuel for the Lime Kiln

As a way to illustrate the importance of water in TO heating value and the improvement expectation in the quality of the refined TO as fuel for the Lime Kiln, the estimation of the TO normal Heating value is shown in Table 11.a and 11.b with 3% water, its measured value (reported CTO), the estimate for a TO of similar composition of water-free TORA/TOFA and NM dry base and the PC estimate for a refined TO that reduces its non-steroidal NM by 50% and its phytosterols at 25% of its initial content.

TABLE 11a

Estimation of Heating value (PC) of Normal TO and Refined TO.

| | PC | | | Normal TO 1 | | Normal TO 2 0% | | Refined TO 3 0% | |
|---|---|---|---|---|---|---|---|---|---|
| | Kcal/g | representative | ref | 3% Agua | Kcal/g | Agua | Kcal/g | Agua | Kcal/g |
| FA | 9.4297 | oleic acid | 32 | 38.80% | 3.6587 | 40.00% | 3.7719 | 46.97% | 4.4289 |
| RA | 9.1372 | abietic acid | 33 | 38.80% | 3.5452 | 40.00% | 3.6549 | 44.65% | 4.0794 |
| NM no Sterols | 11.2617 | eicosanoid | 36 | 11.64% | 1.3109 | 12.00% | 1.3514 | 6.70% | 0.7542 |
| Free sterols | 10.2073 | cholesterol | 34 | 2.91% | 0.2970 | 3.00% | 0.3062 | 1.69% | 0.1724 |
| Sterols Esters | 9.7413 | Lanolin | 35 | 4.85% | 0.4725 | 5.00% | 0.4871 | 0.00% | 0.0000 |
| Water | 0.5394 | Vapor 100° C. | 37 | 3.00% | 0.0162 | 0.00% | 0.0000 | 0.00% | 0.0000 |
| TO | 9.1840 | | 31 | 100.00% | | 100.00% | | 100% | |
| PC total | | | | | 9.2681 | | 9.5714 | | 9.4349 |

TABLE 11b

Relationship between PC values of TO Normal and TO Refined

| | Water Percentage | PC Kcal/g | | |
|---|---|---|---|---|
| A | Normal TO 3% | 9.2681 | calculated by weighing | |
| B | Normal TO 3.7% | 9.2800 | reported by UDT Conception (38) | B/A = 100.13% |
| C | Normal TO without water | 9.5714 | calculated by weighing | C/A = 103.27% |
| D | Refined TO without water | 9.4349 | calculated by weighing | D/A = 101.80% |

REFERENCES (REF)

(31) Liliana Montero, INFORME FINAL PROYECTO “Evaluación de factibilidad técnico-económica y ambiental de reemplazar ácido sulfúrico por sesquisulfato de sodio en Planta de Tall Oil”, Celulosa Arauco y Constitución S. A.—Planta Arauco 30 de junio de 2008., p. 1.

(32) Riddick, J. A., W. B. Bunger, Sakano T. K., Techniques of Chemistry 4th ed., Vol II. Organic Solvent. New York, NY: John Wiley & Sons, 1985., p. 379, citado en https://pubchem.ncbi.nlm.nih.gov/compound/Oleic-acid#section=Viscosity

(33) Michael Ioelovich. Thermodynamics of Biomass-Based Solid Fuels. Academ J Polym Sci. 2018; 2(1): 555577.

(34) Walter H. Johnson, The Enthalpies of Combustion and Formation of Cholesterol [cholest-5-en-3-ol $(3_{\beta})$], JOURNAL OF RESEARCH of the National Bureau of Standards—A. Physics and Chemistry Vol. 79A, No. 3, May-June 1975.

(35) O L Paladines, J T Reid, A Bensadoun, B D Vanniekerk, HEAT OF COMBUSTION VALUES OF THE PROTEIN AND FAT IN THE BODY AND WOOL OF SHEEP, J Nutr. 1964 January; 82:145-9.

(36) Prosen, E. J.; Rossini, F. D., *Heats of combustion and formation of the paraffin hydrocarbons at* 25° C., J. Res. NBS, 1945, 263-267.

(37) Rios A., Luís Guillermo Determinación del calor de vaporización del agua Scientia Et Technica, vol. XVI, núm. 49, diciembre, 2011, pp. 163-166 Universidad Tecnológica de Pereira Pereira, Colombia.

(38) https://www.udt.cl/medio-ambiente-y-servicios/sesquisulfato/

The invention claimed is:

1. A recovery method for neutral and lipid components contained in Tall Oil Soap (TOS) or its saponified derivatives; lipid components neutral components or neutral material (NM) comprising the following steps:

(a) obtaining TOS or saponifying a saponifiable TOS-derived RM until total hydrolysis of phytosterol esters;

(b) from the TOS or the saponified RM, producing a solution or dispersion of said TOS or said saponified RM in a solvent that dissolves the major components: the sodium salts of fatty acids and/or rosinic acids;

c) from the solution or dispersion obtained in step (b) precipitating a stream enriched in NM and/or phytosterols, non-volatile base;

(d) separating said precipitate enriched in NM and/or phytosterols, obtained in step (c), from the saponified liquid stream depleted in NM and/or phytosterols;

(e) washing the precipitate separated from step (d) by one or more washes that include one or more solvents that may include water, alcohols, or solvent recovered from the process and recovering a washed precipitate;

(f) recovering the saponified liquid streams depleted in NM and/or phytosterols obtained in steps (d) and (e) but more concentrated in fatty acid soaps and/or rosinic acid soaps, non-volatile base, with respect to the initial TOS or the initial saponified RM to obtain a fraction called refined TOS;

(g) acidulate the saponified liquid stream depleted in NM and/or phytosterols, from step (f), using sulfuric acid or sodium sesquisulfate solutions or a mixture thereof, considering in any case: (a) total alkalinity of the liquid stream to calculate the concentrations of the acidulating (b) aqueous solutions of sulfuric acid and/or sodium sesquisulfate concentrations not greater than 70% w/w and 30% w/w respectively and (c) that the pH of the mixture is kept between 3 and 4;

(h) separating the acidulated stream from step (g) into a stream rich in fatty acids and rosinic acids and a used solvent stream containing substantially no fatty acids or rosinic acids;

(i) recovering from the stream rich in fatty acids and rosinic acids of step (h) a stream of refined Tall Oil (TO) essentially free of water, solvent and salts;

(j) recovering from the used solvent stream separated in step (h), and containing substantially no fatty acids or rosinic acids, a Recovered Solvent (RS) stream to be reused during the process, for example in steps b), e) or g).

2. The recovery method of neutral and lipid components contained in Tall Oil Soap (TOS) or their saponified derivatives according to claim 1, wherein the preparation of the solvent for the step (b), consisting of a mixture of water and other solvents, are considered the contributions of, water, and other solvents from the solvents and/or constituents of the solution or dispersion and the TOS or the saponified RM solutions.

3. The recovery method of neutral and lipid components contained in Tall Oil Soap (TOS) or their saponified derivatives according to claim 1, wherein the solvent of step (b) consists of a mixture of water/alcohol wherein the alcohol is a monohydric alcohol of no more than 4 carbon atoms and in a ratio comprised in the range between 55/45 to 80/20 w/w.

4. The recovery method of neutral and lipid components contained in Tall Oil Soap (TOS) or their saponified derivatives according to claim 1, wherein the solvent mentioned in steps (b) and (e) is a mixture consisting of 2 or more of the following solvents: methanol, ethanol, n-propanol, isopropanol, n-butanol, sec-butanol, tert-butanol, iso-butanol, ethylene glycol, diethylene glycol, diacetone alcohol, and water.

5. The recovery method of neutral and lipid components contained in the Tall Oil Soap (TOS) or their saponified derivatives according to claim 1, wherein the solution of step (b) is prepared by maintaining a ratio between solvent/Tora-Tofa contained in the Soap, or in the saponified RM, in a range between 8/1 and 22/1 when the solvent comprises ethanol as the sole alcohol.

6. The recovery method of neutral and lipid components contained in the Tall Oil Soap (TOS), or their saponified derivatives according to claim 1, wherein the solution of the step (b) is prepared by maintaining a ratio between solvent/Tora-Tofa contained in the Soap, or in the saponified RM, in a range between 10/1 and 18/1 when the solvent comprises methanol as the sole alcohol.

7. The recovery method of neutral and lipid components contained in Tall Oil Soap (TOS), or their saponified derivatives according to claim 1, wherein the solvent of the step (b) consists of a water/alcohol mixture wherein the alcohol is preferably a monohydric alcohol of no more than 4 carbon atoms and a ratio more preferably comprised in the range between 65/35 to 75/25 w/w for ethanol and between 55/45 at 65/35 for methanol.

8. The recovery method of neutral and lipid components contained in Tall Oil Soap (TOS), or their saponified derivatives according to claim 1, sodium sulfate can be optionally incorporated in step (b).

9. The recovery method of neutral and lipid components contained in Tall Oil Soap (TOS), or their saponified derivatives according to claim 1, wherein the incorporation of sodium sulfate in step (b) can be carried out by partial neutralization of the alkalinity of the TOS solution or dispersion or its saponified derivatives up to a pH greater than 8.

10. The recovery method of neutral and lipid components contained in Tall Oil Soap (TOS), or their saponified derivatives according to claim 1, wherein the incorporation of sodium sulfate in step (b) is carried out using a sulfuric acid aqueous solution or sodium sesquisulfate aqueous solution or an aqueous solution of a mixture thereof and wherein the solution concentrations are not greater than 70% w/w for sulfuric acid and not greater than 30% w/w for sodium sesquisulfate.

11. The recovery method of neutral and lipid components contained in Tall Oil Soap (TOS), or their saponified derivatives according to claim 1, wherein the step (c) of precipitation is carried out by means of one or a combination of the following operations:

(c1) gradual cooling down to a temperature below 30° C., (c2) addition of water or a solvent mixture containing water, (c3) addition of sodium sulfate into the mixture to be precipitated.

12. The recovery method of neutral and lipid components contained in Tall Oil Soap (TOS), or their saponified derivatives according to claim 1, wherein the NM and/or phytosterol enriched precipitated stream of step (c) is separated in the step (d) by filtration and/or centrifugation.

13. The recovery method of neutral and lipid components contained in Tall Oil Soap (TOS), or their saponified derivatives according to claim 1, wherein the precipitation and separation of the steps (c) and (d) can be carried out in 2 or more successive stages respectively, at two or more successively descending temperatures for cooling the suspension and wherein the separated liquid phase of a stage is cooled to a lower temperature than the filtration temperature of the previous stage to form a new precipitate enriched in NM and/or phytosterols.

14. The recovery method of neutral and lipid components contained in Tall Oil Soap (TOS), or their saponified derivatives according to claim 1, wherein the precipitation and separation of steps (c) and (d) can be carried out in 2 or more successive stages by cooling down to a temperature or by adding water or sodium sulfate or a combination of the above operations, then carrying out in step (d) the separation of a first precipitate and a first liquid stream and then proceeding with the said first liquid stream to a new precipitation step (c) either by cooling down to a lower temperature or by another water addition or sodium sulfate addition, or a combination of the above operations until the appearance of a second precipitate to be collected; by separating of a second liquid stream even poorer in NM and phytosterols but even richer in salts of fatty acids and/or rosinic acid salts dry base while the second precipitate collected is mixed with the first precipitate.

15. The recovery method of neutral and lipid components contained in Tall Oil Soap (TOS), or their saponified derivatives according to claim 1, wherein the phytosterol concentration in the NM enriched stream of stage (e), obtained from TOS or saponified RM, shows a phytosterol concentration 4-fold or more higher than the initial concentration in the precipitate with a recovery efficiency of phytosterols of at least 45%.

16. The recovery method of neutral and lipid components contained in Tall Oil Soap (TOS), or their saponified derivatives according to claim 1, wherein the washed precipitate from stage (e) can be purified through:

dissolving phytosterols and insolubilizing their contaminants or dissolving its contaminants and insolubilizing the phytosterols or dissolving phytosterols in an immiscible phase with another solvent phase for its pollutants using one or more solvents from the group consisting of a solvent from the process, methanol, ethanol, n-propanol, isopropanol, n-butanol, sec-butanol, tert-butanol, iso-butanol, hexane, cyclohexane, heptane, methyl-cyclohexane, ethylene glycol, diethylene glycol, diacetone alcohol, acetone, methyl ethyl ketone, methyl isobutyl ketone, ethyl lactate, ethyl acetate, furfural, N, N-dimethylformamide, acetonitrile, dimethylsulfoxide and water, and/or solvent mixtures that may include alcohols, water, and/or recovered solvent.

17. The recovery method of neutral and lipid components contained in the Tall Oil Soap (TOS), or their saponified derivatives according to claim 1, wherein the washed precipitate of step (e) can be further purified by crystallization, including washing, in a solvent mixture comprising water, an alcohol and a hydrocarbon.

18. The recovery method of neutral and lipid components contained in the Tall Oil Soap (TOS), or their saponified derivatives according to claim 1, wherein the washed precipitate of the step (e) and purified by washing or crystallization or enriched in phytosterols by distillation, can be purified by crystallization in a solvent mixture that includes water, an alcohol of no more than 4 carbon atoms or from the group consisting of methanol, ethanol and isopropanol and/or a hydrocarbon or mixture of hydrocarbons with no more than 10 carbon atoms or from the group consisting of hexane, cyclohexane, heptane and methyl-cyclohexane.

19. The recovery method of neutral and lipid components contained in Tall Oil Soap (TOS), or their saponified derivatives according to claim 1, wherein the washed or purified precipitate of the step (e) can be further purified by short path distillation, falling film evaporation or molecular distillation either directly feeding the precipitate or in admixture with a compatible feed fluid of much lower vapor pressure than phytosterols, and which previously stripped of distillate by using the same equipment under the same conditions, allows to obtain a distillate enriched in phytosterols from the precipitate.

20. The recovery method of neutral and lipid components contained in Tall Oil Soap (TOS), or their saponified derivatives according to claim 1, CHARACTERIZED in that are considered proper feed fluids those compounds found in families such as triglycerides, fatty acid esters with phytosterols, fatty acid esters with fatty alcohols, fatty acid monoesters with triglycerols or tetraglycerols, esters of dimeric acids with methyl, ethyl, or propyl alcohols, hydrocarbon fractions, isoparaffins with a high flash point, or mineral oils, silicone oils or inorganic compounds or their blends with melting point between 10° and 150° C.

21. The recovery method of neutral and lipid components contained in Tall Oil Soap (TOS), or their saponified derivatives according to claim 1, wherein the feed fluid is able to dissolve fatty acid soaps, lignins, or low concentrations of inorganic compounds typical of the Kraft process.

22. The recovery method of neutral and lipid components contained in Tall Oil Soap (TOS), or their saponified derivatives according to claim 1, wherein the stream depleted in NM and/or phytosterols of the step (f) but enriched in fatty acids and/or rosinic acids soaps a bottom enriched in fatty acids and/or rosinic acids is separated in the step (h) obtained by acidulation in the step (g) to pH 3 to 4 and centrifugation in the range of 100 to 5000 g RCF for a period comprised between 1 and 30 minutes and at a temperature in the range between 0 to 30° C.

23. The recovery method of neutral and lipid components contained in Tall Oil Soap (TOS), or their saponified derivatives according to claim 1, wherein the step (i) the recovery of refined TO, essentially free of mineral acidity or residual sulfuric acidity or sesquisulfate and also free of water, solvent, and salts is carried out by neutralizing said residual acidity with NaOH or $Na_2CC>_3$ or by washing or by filtration or by centrifugation or by evaporation of residual solvents or a combination of these operations.

24. The recovery method of neutral and lipid components contained in the Tall Oil Soap (TOS), or their saponified derivatives according to claim 1, wherein the mineral acidity in the step (h) of the acidulated liquid phase or first oil phase and/or washed oil phase or second oil phase can be neutralized with NaOH or $Na_2CO_3$, thus constituting a neutralized second oil phase.

25. The recovery method of neutral and lipid components contained in Tall Oil Soap (TOS), or their saponified derivatives according to claim 1, CHARACTERIZED in that said second oily phase of the step (h) and containing the refined TO can be constituted into a refined TO essentially free of mineral acidity, water, solvent and salts to be used as feed in a distillation to separate the fatty acids from the rosinic acids, with properties improved compared to those of the derivatives of the original TO in terms of its decreased NM content, improved Acid Value and decreased Gardner Color due to the predominance of the components that determine said qualities, such as fatty and rosinic acids, through one or a combination of some unit operations of the group consisting of neutralization, washing, filtration, centrifugation and evaporation of residual solvents.

26. The recovery method of neutral and lipid components contained in the Tall Oil Soap (TOS), or their saponified derivatives according to claim 1, CHARACTERIZED in that said second oily phase of the step (h) neutralized and containing the refined TO can be constituted into a refined TO essentially free of mineral acidity, water, solvent and salts to be used as fuel, by means of one or a combination of some unit operations from the group consisting of: neutralization, washing, filtration, centrifugation and evaporation of residual solvents.

27. The recovery method of neutral and lipid components contained in Tall Oil Soap (TOS), or their saponified derivatives according to claim 1, wherein the fractionation of the Refined or refined TO from the stage (I) free of mineral acidity allows producing TOFA and TORA fractions with concentrations of fatty acids or rosinic acids higher than 90% and concentrations of unsaponifiables or NM lower than 10% and TOFA and/or TORA fractions with Gardner Color lower than 5.

28. The recovery method of neutral and lipid components contained in the Tall Oil Soap (TOS), or their saponified derivatives according to claim 1, wherein the recovery of the solvent recovered from the step (j) to reuse is carried out by neutralizing the free acidity preferably with NaOH or $Na_2CO_3$, cooling under 5° C., crystallization and filtration of sodium sulfate.

29. The recovery method of neutral and lipid components contained in the Tall Oil Soap (TOS), or their saponified derivatives according to claim 1, wherein step (c) of precipitation of the saponified TOS or RM solution or dispersion prepared in step (b) the stirring of the soap solution is provided with low shear stress stirrers that rotate between 10 and 100 rpm for periods of time between 20 to 300 seconds followed by periods of time without stirring between 5 and 60 minutes.

30. The recovery method of neutral and lipid components contained in the Tall Oil Soap (TOS), or their saponified derivatives according to claim 1, wherein during the step (j) for obtaining the Recovered Solvent, the water concentration is decreased in the solvent by forming sodium sulfate hydrates that are separated by filtration or centrifugation.

31. The recovery method of neutral and lipid components contained in Tall Oil Soap (TOS), or their saponified derivatives according to claim 1, wherein step (j) distillation and evaporation are not used to obtain the recovered solvent.

* * * * *